(12) United States Patent
Greco et al.

(10) Patent No.: US 12,294,654 B1
(45) Date of Patent: *May 6, 2025

(54) PROTOCOLS FOR DECENTRALIZED NETWORKS

(71) Applicant: Protocol Labs, Inc., San Francisco, CA (US)

(72) Inventors: Nicola Greco, Cambridge, MA (US); Juan Batiz-Benet, Walnut, CA (US)

(73) Assignee: Protocol Labs, Inc., Wilmington, DE (US)

( * ) Notice: Subject to any disclaimer, the term of this patent is extended or adjusted under 35 U.S.C. 154(b) by 231 days.

This patent is subject to a terminal disclaimer.

(21) Appl. No.: 18/075,794

(22) Filed: Dec. 6, 2022

Related U.S. Application Data

(63) Continuation of application No. 16/866,370, filed on May 4, 2020, now Pat. No. 11,570,001, which is a
(Continued)

(51) Int. Cl.
*H04L 9/32* (2006.01)
*H04L 9/00* (2022.01)
*H04L 9/06* (2006.01)

(52) U.S. Cl.
CPC .......... *H04L 9/3218* (2013.01); *H04L 9/0637* (2013.01); *H04L 9/3213* (2013.01); *H04L 9/3271* (2013.01); *H04L 9/50* (2022.05)

(58) Field of Classification Search
CPC ... H04L 9/3218; H04L 9/0637; H04L 9/3271; H04L 9/3213; H04L 2209/38; G06F 21/602; G06Q 20/389
See application file for complete search history.

(56) References Cited

U.S. PATENT DOCUMENTS

| 8,799,334 B1 | 8/2014 | Stefanov |
| 8,984,384 B1 | 3/2015 | Juels |

(Continued)

OTHER PUBLICATIONS

Benet et al., "Proof of Replication Technical Report (WIP)", Protocol Labs, Jul. 27, 2017.
(Continued)

*Primary Examiner* — Shanto Abedin
(74) *Attorney, Agent, or Firm* — Fish & Richardson P.C.

(57) ABSTRACT

Methods, systems, and apparatus, including computer programs encoded on computer storage media, for establishing a proof of storage over a specified period of time. One of the methods includes: (i) receiving, at a prover, an initial input challenge; (ii) producing, at the prover, an output proof proving that the prover has access to specified data for a specified time, wherein producing the output proof includes: (a) producing, at the prover, an initial proof responsive to the initial input challenge, the initial proof proving that the prover is storing specified data; (b) generating, at the prover, a new input challenge based at least in part on the initial proof: (c) producing, at the prover, a new proof responsive to the new input challenge, the new proof proving that the prover is storing the specified data; and (d) repeating, at the prover, the generating step and the producing a new proof responsive to the new input challenge step a number of times, the repeating step generating sequential proofs of storage to determine time of storage, wherein each generating step is based at least in part on a most recent new proof, and (iii) forwarding the output proof, e.g., to a blockchain.

20 Claims, 17 Drawing Sheets

Related U.S. Application Data continuation-in-part of application No. 16/195,536, filed on Nov. 19, 2018, now Pat. No. 10,708,071, application No. 18/075,794 is a continuation-in-part of application No. 16/726,520, filed on Dec. 24, 2019, now Pat. No. 11,245,528, which is a continuation-in-part of application No. 16/195,621, filed on Nov. 19, 2018, now Pat. No. 10,554,407.

(60) Provisional application No. 62/697,123, filed on Jul. 12, 2018, provisional application No. 62/697,091, filed on Jul. 12, 2018, provisional application No. 62/697,097, filed on Jul. 12, 2018, provisional application No. 62/901,207, filed on Sep. 16, 2019.

(56) References Cited

U.S. PATENT DOCUMENTS

| | | | |
|---|---|---|---|
| 10,250,708 B1 | 4/2019 | Carver | |
| 2006/0112273 A1 | 5/2006 | Tuyls | |
| 2010/0122093 A1 | 5/2010 | Tuyls | |
| 2010/0205443 A1 | 8/2010 | Zhao | |
| 2011/0119481 A1* | 5/2011 | Auradkar | G06F 21/602 |
| | | | 713/150 |
| 2013/0279697 A1 | 10/2013 | Garcia | |
| 2017/0005804 A1 | 1/2017 | Zinder | |
| 2018/0025166 A1* | 1/2018 | Daniel | G06F 9/5011 |
| | | | 713/189 |
| 2018/0053182 A1 | 2/2018 | Mokhasi | |
| 2018/0077122 A1 | 3/2018 | Hoss | |
| 2018/0109541 A1 | 4/2018 | Gleichauf | |
| 2018/0152513 A1 | 5/2018 | Bohli | |
| 2018/0322561 A1 | 11/2018 | Arora | |
| 2018/0336552 A1* | 11/2018 | Bohli | H04L 9/3297 |
| 2018/0337769 A1 | 11/2018 | Gleichauf | |
| 2019/0044739 A1 | 2/2019 | Sachdev et al. | |
| 2019/0182029 A1 | 6/2019 | Yim | |
| 2019/0282906 A1 | 9/2019 | Yong | |
| 2019/0303622 A1* | 10/2019 | Versteeg | H04L 9/50 |
| 2019/0318129 A1 | 10/2019 | David | |
| 2019/0334912 A1 | 10/2019 | Sloane | |
| 2019/0334920 A1 | 10/2019 | Kelly | |
| 2020/0013027 A1 | 1/2020 | Zhu | |
| 2020/0134656 A1 | 4/2020 | Padmanabhan | |
| 2020/0151712 A1* | 5/2020 | Felten | H04L 9/3247 |
| 2020/0226861 A1* | 7/2020 | Troia | H04L 9/3242 |
| 2020/0394652 A1 | 12/2020 | Youb et al. | |
| 2022/0116223 A1* | 4/2022 | Zamani | H01B 7/295 |

OTHER PUBLICATIONS

Curtmola et al., "MR-PDP: Multiple-Replica Provable Data Possession", 28th International Conference on Distributed Computing Systems, 2008, pp. 411-420. (Year: 2008).

Dziembowski et al., "Proofs of Space", pp. 1-31 (Year: 2015).

Marko Vukolic, The Quest for Scalable Blockchain Fabric: Proof-of-Work vs. BFT Replication, IBM Research—Zurich, 14 pages, 2015.

Moran et al., "Simple Proofs of Space-Time and Rational Proofs of Storage", 23 pages, 2019.

No Author Listed, "Filecoin: A Decentralized Storage Network", Protocol Labs, Jan. 2, 2018.

No Author Listed, "Filecoin: A Decentralized Storage Network", Protocol Labs, Jul. 19, 2017.

* cited by examiner

```
Filecoin Protocol Sketch
Network                                              Storage Mine
at each epoch t in the ledger L:                     at any time:
  1. for each new block:                               1. renew expired pledges via Manage.PledgeSector
     (a) check if the block is in the valid format     2. pledge new storage via Manage.PledgeSector
     (b) check if all transactions are valid           3. submit a new ask order via Put.AddOrder
     (c) check if all orders are valid
     (d) check if all proofs are valid               at each epoch t:
     (e) check if all pledges are valid                1. for each O_ask in the orderbook:
     (f) discard block, if any of the above fails        (a) find matched orders via Put.MatchOrders
  2. for each new order O introduced in t              (b) start a new deal by contacting the matching
     (a) add O to the Storage Market's orderbook           client
     (b) if O is a bid: lock O.funds                 2. for each sector pledged:
     (c) if O is an ask: lock O.space                   (a) generate proof of storage via
     (d) if O is a deal: run Put.AssignOrders              Manage.ProveSector
  3. for each O in the Storage Market's orderbook:     (b) if time to post the proof (every Δproof
     (a) check if O has expired (or canceled):             epochs), submit it to the blockchain
        • remove O from the orderbook
        • return unspent O.funds                    on receiving piece p from client C:
        • free O.space from AllocTable                 1. check if the piece is of the size specified in the
     (b) if O is a deal, check if the expected proofs      order O_ask
         exist by running Manage.RepairOrders          2. create O_deal and sign it and send it to C
        • if one missing, penalize the M's pledge     3. store the piece in a sector
          collateral                                  4. if the sector is full, run Manage.SealSector
        • if proofs are missing for more than Δfault
          epochs, cancel order and re-introduce it   Retrieval Mine
          to the market                              at any time:
        • if the piece cannot be retrieved and re-     1. gossip ask orders to the network
          constructed from the network, cancel or-    2. listen to bid orders from the network
          der and re-fund the client
                                                     on retrieval request from C:
Client                                                 1. start payment channel with C
at any time:                                           2. split data in multiple parts
  1. submit new storage orders via Put.AddOrders      3. only send parts if payments are received
     (a) find matching orders via Put.MatchOrders
     (b) send file to the matched miner M
  2. submit new retrieval orders via Get.AddOrders
     (a) find matching orders via Get.MatchOrders
     (b) create a payment channel with M on receiving O_deal from Storage Miners M:
  1. sign O_deal
  2. submit the signed O_deal to the blockchain via
     Put.AddOrders on receiving (p_i) from Retrieval Miners M:
  1. verify that (p_i) is valid and it was requested
  2. send a micropayment to M
```

FIG. 1B

| Filecoin PoRep protocol | Filecoin PoSt protocol |
|---|---|
| Setup<br>• INPUTS:<br>  – prover key pair $(pk_P, sk_P)$<br>  – prover SEAL key $pk_{SEAL}$<br>  – data $D$<br>• OUTPUTS: replica $R$, Merkle root $rt$ of $R$, proof $\pi_{SEAL}$<br>1) Compute $h_D := CRH(D)$<br>2) Compute $R := Seal'(D, sk_P)$<br>3) Compute $rt := MerkleCRH(R)$<br>4) Set $\vec{x} := (pk_P, h_D, rt)$<br>5) Set $\vec{w} := (sk_P, D)$<br>6) Compute $\pi_{SEAL} := SCIP.Prove(pk_{SEAL}, \vec{x}, \vec{w})$<br>7) Output $R, rt, \pi_{SEAL}$<br><br>Prove<br>• INPUTS:<br>  – prover Proof-of-Storage key $pk_{PoS}$<br>  – replica $R$<br>  – random challenge $c$<br>• OUTPUTS: a proof $\pi_{PoS}$<br>1) Compute $rt := MerkleCRH(R)$<br>2) Compute $path :=$ Merkle path from $rt$ to leaf $R_c$<br>3) Set $\vec{x} := (rt, c)$<br>4) Set $\vec{w} := (path, R_c)$<br>5) Compute $\pi_{PoS} := SCIP.Prove(pk_{PoS}, \vec{x}, \vec{w})$<br>6) Output $\pi_{PoS}$<br><br>Verify<br>• INPUTS:<br>  – prover public key, $pk_P$<br>  – verifier SEAL and PoS keys $vk_{SEAL}, vk_{PoS}$<br>  – hash of data $D$, $h_D$<br>  – Merkle root of replica $R$, $rt$<br>  – random challenge, $c$<br>  – tuple of proofs, $(\pi_{SEAL}, \pi_{PoS})$<br>• OUTPUTS: bit $b$, equals 1 if proofs are valid<br>1) Set $\vec{x_1} := (pk_P, h_D, rt)$<br>2) Compute $b_1 := SCIP.Verify(vk_{SEAL}, \vec{x_1}, \pi_{SEAL})$<br>3) Set $\vec{x_2} := (rt, c)$<br>4) Compute $b_2 := SCIP.Verify(vk_{PoS}, \vec{x_2}, \pi_{PoS})$<br>5) Output $b_1 \wedge b_2$ | Setup<br>• INPUTS:<br>  – prover key pair $(pk_P, sk_P)$<br>  – prover PoSt key pair $pk_{PoST}$<br>  – some data $D$<br>• OUTPUTS: replica $R$, Merkle root $rt$ of $R$, proof $\pi_{SEAL}$<br>1) Compute $R, rt, \pi_{SEAL} := PoRep.Setup(pk_P, sk_P, pk_{SEAL}, D)$<br>2) Output $R, rt, \pi_{SEAL}$<br><br>Prove<br>• INPUTS:<br>  – prover PoSt key $pk_{PoST}$<br>  – replica $R$<br>  – random challenge $c$<br>  – time parameter $t$<br>• OUTPUTS: a proof $\pi_{PoST}$<br>1) Set $\pi_{PoST}^0 := 1$<br>2) Compute $rt := MerkleCRH(R)$<br>3) For $i = 0..t$:<br>  a) Set $c^i := CRH(\pi_{PoST}^{i-1}||i)$<br>  b) Compute $\pi_{PoS} := PoRep.Prove(pk_{PoS}, R, c^i)$<br>  c) Set $\vec{x} := (rt, c, i)$<br>  d) Set $\vec{w} := (\pi_{PoS}, \pi_{PoST}^{i-1})$<br>  e) Compute $\pi_{PoST}^i := SCIP.Prove(pk_{PoST}, \vec{x}, \vec{w})$<br>4) Output $\pi_{PoST}$<br><br>Verify<br>• INPUTS:<br>  – prover public key $pk_P$<br>  – verifier SEAL and PoST keys $vk_{SEAL}, vk_{PoST}$<br>  – hash of some data $h_D$<br>  – Merkle root of some replica $rt$<br>  – random challenge $c$<br>  – time parameter $t$<br>  – tuple of proofs $(\pi_{SEAL}, \pi_{PoST})$<br>• OUTPUTS: bit $b$, equals 1 if proofs are valid<br>1) Set $\vec{x_1} := (pk_P, h_D, rt)$<br>2) Compute $b_1 := SCIP.Verify(vk_{SEAL}, \vec{x_1}, \pi_{SEAL})$<br>3) Set $\vec{x_2} := (rt, c, t)$<br>4) Compute $b_2 := SCIP.Verify(vk_{PoST}, \vec{x_2}, \pi_{PoST})$<br>5) Output $b_1 \wedge b_2$ |

FIG. 4

Data Structures

Pledge
pledge := (size, coll)$_{M_i}$

- size, the size of the sector being pledged.
- coll, the collateral specific to this pledge that $M_i$ deposits.

Orderbook
OrderBook: ($O^1..O^n$)

- $O^i$, currently valid *deal, ask, bid* orders.

Allocation
allocTable: $\{M_1 \rightarrow (allocEntry..allocEntry), M_2..\}$ allocEntry: (sid, orders, last, missing)

- sid, sector id
- $O^i$, currently valid *deal, ask, bid* orders.
- orders, set of orders $\{O_{deal}..O_{deal}\}$
- last, last proof of storage in the ledger $\mathcal{L}$
- missing, counter for missing proofs

FIG. 5

|  | Client | Network | Miner |
|---|---|---|---|
| Put | AddOrders(...,$O_{bid}$) | | AddOrders(...,$O_{ask}$) |
| | | MatchOrders(..) | |
| | SendPiece(...,$O_{bid}$, $p$) | | ReceivePiece(...,$O_{ask}$) |
| | AddOrders($O_{deal}$) | | AddOrders(...,$O_{deal}$) |
| Get | AddOrder(...,$O_{bid}$) | | AddOrder(...,$O_{ask}$) |
| | | MatchOrders(..) | |
| | ReceivePiece(...,$O_{bid}$) | | SendPiece(...,$O_{ask}$, $p$) |
| | AddOrders(...,$O_{deal}$) | | AddOrders(...,$O_{deal}$) |
| Manage | | | PledgeSector() |
| | | AssignOrders(...,$O_{deal}$) | SealSector(..) |
| | | | ProveSector(..) |
| | | RepairOrders(..) | |

FIG. 6

```
Put Protocol                                    Get Protocol
Market                                          Market
AddOrders                                       AddOrders
 • INPUTS: list of orders O^1...O^n              • INPUTS: list of orders O^1...O^n
 • OUTPUTS: bit b, equals 1 if successful        • OUTPUTS: none
 1) Set tx_order := (O^1,...,O^n)                1) Gossip O^1...O^n to the network
 2) Submit tx_order to L
 3) Wait for tx_order to be included in L       MatchOrders
 4) Output 1 on success, 0 otherwise             • INPUTS:
                                                   – the current Retrieval Market OrderBook
MatchOrders                                        – query order to match O^q
 • INPUTS:                                       • OUTPUTS: matching orders O^1...O^n
   – the current Storage Market OrderBook        1) Match each O^i in OrderBook such that:
   – query order to match O^q                      a) Check O^i.piece is equal to O^q.piece
 • OUTPUTS: matching orders O^1...O^n             b) If O^q is an ask order:
 1) Match each O^i in OrderBook such that:           i) Check if O^i is bid order
   a) If O^q is an ask order:                       ii) Check O^i.price ≥ O^q.price
      i) Check if O^i is bid order                c) If O^q is a bid order:
      ii) Check O^i.price ≥ O^q.price                i) Check if O^i is ask order
      iii) Check O^i.size ≤ O^q.space               ii) Check O^i.price ≤ O^q.price
   b) If O^q is a bid order:                    2) Output matched orders O^1...O^n
      i) Check if O^i is ask order
      ii) Check O^i.price ≤ O^q.price           Exchange
      iii) Check O^i.space ≥ O^q.size           SendPiece
 2) Output matched orders O^1...O^n              • INPUTS:
                                                   – an ask order O_ask
Exchange                                           – a bid order O_bid
SendPiece                                          – a piece p
 • INPUTS:                                       • OUTPUTS: a deal order O_deal signed by C_i
   – an ask order O_ask                          1) Create O_deal:
   – a bid order O_bid                             a) Set O_deal.ask := O_ask
   – a piece p                                    b) Set O_deal.bid := O_bid
 • OUTPUTS: a deal order O_deal signed by M_j   2) Get identity of C_i from O_bid signature
 1) Get identity of M_j from O_ask signature    3) Setup a micropayment channel with C_i
 2) Send (O_ask, O_bid, p) to M_j               4) For each block of data p_j of p:
 3) Receive O_deal signed by M_j                  a) Set π_j to be a merkle path from H(p) to p_j
 4) Check if O_deal is valid according to Definition   b) Send (O_deal, p_j, π_j) to C_i
 5) Output O_deal                                 c) Receive (O_deal, j)_{C_i}
                                                5) Output O_deal
ReceivePiece
 • INPUTS:                                      ReceivePiece
   – signing key for M_j                         • INPUTS:
   – current orderbook OrderBook                   – a client's key C_i
   – ask order O_ask                              – an ask order O_ask
   – bid order O_bid                              – a bid order O_bid
   – piece p                                      – merkle tree hash of p in the orders h_p
 • OUTPUTS: deal order O_deal signed by C_i and M_j   • OUTPUTS: a piece p
 1) Check if O_bid is valid:                    1) Create O_deal:
   a) Check if O_bid is in OrderBook              a) Set O_deal.ask := O_ask
   b) Check if O_bid is not referenced by other active O_deal   b) Set O_deal.bid := O_bid
   c) Check if O_bid.size is equal to |p|       2) Get identity of M_j from O_ask signature
   d) Check if O is signed by M_j               3) Set up a micropayment channel with M_j (or re-using
 2) Store p locally                                 an existing one)
 3) Set O_deal := (O_ask, O_bid, H(p))_{M_j}   4) When receiving (O_deal, p_j, π_j) from M_j:
 4) Get identity of C_i from O_bid                a) Check if O_deal is valid and matches O_ask and O_bid
 5) Send O_deal to C_i                            b) Check if π_j is a valid merkle-path with root hash
 6) Output O_deal                                    h_p
                                                  c) Send (O_deal, j)_{C_i}
                                                5) Output p
```

FIG. 7

Manage Protocol

Network

AssignOrders
- INPUTS:
  - deal orders $O^1_{deal} \ldots O^n_{deal}$
  - allocation table allocTable
- OUTPUTS: updated allocation table allocTable'
  1) Copy allocTable to allocTable'
  2) For each order $O_{deal}$:
     a) Check if $O_{deal}$ is valid according to Definition
     b) Get $M_j$ from $O_{deal}$ signature
     c) Add details from $O_{deal}$ to allocTable'
  3) Output allocTable'

RepairOrders
- INPUTS:
  - current time $t$
  - current ledger $\mathcal{L}$
  - table of current allocations allocTable
- OUTPUTS: orders to repair $O^1_{fail} \ldots O^n_{fail}$, updated allocation table allocTable'
  1) for each allocEntry in allocTable:
     a) If $t < $ allocEntry.last $+ \Delta_{proof}$: skip
     b) Update allocEntry.last $= t$
     c) Check if $\pi$ is in $\mathcal{L}_{t-\Delta_{proof}:t}$ and PoSt.Verify($\pi$)
     d) On success: update allocEntry.missing $= 0$
     e) On failure:
        i) update allocEntry.missing++
        ii) If allocEntry.missing $> \Delta_{fail}$ then set all the orders from the current sector as failed orders
  2) Output failed orders $O^1_{fail} \ldots O^n_{fail}$ and allocTable'

Miner

PledgeSector
- INPUTS:
  - current allocation table allocTable
  - pledge request pledge
- OUTPUTS: allocTable'
  1) Copy allocTable to allocTable'
  2) Set topup $:= $ (pledge)
  3) Submit topup to $\mathcal{L}$
  4) Wait for topup to be included in $\mathcal{L}$
  5) Add new sector of size pledge.size in allocTable'
  6) Output allocTable'

SealSector
- INPUTS:
  - miner public/private key pair $\mathcal{M}$
  - sector index $j$
  - allocation table allocTable
- OUTPUTS: a proof $\pi_{SEAL}$, a root hash rt
  1) Find all the pieces $p_1 \ldots p_n$ in sector $S_j$ in the allocTable
  2) Set $D := p_1 || p_2 || \ldots || p_n$
  3) Compute $(\mathcal{R}, rt, \pi_{SEAL}) := $ PoSt.Setup($\mathcal{M}, j$, pieces, $D$)
  4) Output $\pi_{SEAL}$, rt ProveSector
- INPUTS:
  - miner public/private key pair $\mathcal{M}$
  - sector index $j$
  - challenge $c$
- OUTPUTS: a proof $\pi_{POST}$
  1) Find $\mathcal{R}$ for sector $j$
  2) Compute $\pi_{POST} := $ PoSt.Prove(pk$_{POST}, \mathcal{R}, c, \Delta_{proof}$)
  3) Output $\pi_{POST}$

FIG. 8

Verifiable Market Protocol

Order matching:

1. Participants add *buy* orders and *sell* orders to the orderbook.
2. When two orders match, involved parties jointly create a *deal* order that commits the two parties to the exchange, and propagate it to the network by adding it to the orderbook.

Settlement:

3. The network ensures that the transfer of goods or services has been executed correctly, by requiring sellers to generate cryptographic proofs for their exchange/service.
4. On success, the network processes the payments and clears the orders from the orderbook.

FIG. 9

| Storage Market Orders | Retrieval Market Orders |
|---|---|
| *bid order*<br>$O_{bid} = \{size, funds, price, time, coll, coding\}_{C_i}$<br>• size, the size of the piece to be stored<br>• funds, the total amount that client $C_i$ is depositing<br>• time, the maximum epoch time for which the file should be stored<br>• price, the spacetime price in Filecoin<br>• coll, the collateral specific to this piece that the miner is required to deposit<br>• coding, the erasure coding scheme for this piece<br><br>*ask order*<br>$O_{ask}: \{space, price\}_{M_j}$<br>• space, amount of space Storage Miner $M_j$ is providing in the order<br>• price, the spacetime price in Filecoin<br><br>*deal order*<br>$O_{deal}: \{ask, bid, ts, hash\}_{C_i, M_j}$<br>• ask, a cryptographic reference to $O_{ask}$ from $C_i$<br>• order, a cryptographic reference to $O_{bid}$ from $M_j$<br>• ts, timestamp epoch in which the order has been signed by $M_j$<br>• hash, cryptographic hash of the piece that $M_j$ will store<br><br>*If not specified, the piece will be stored until expiration of funds.*<br>*If not specified, when a Storage Miner is faulty, the network can re-introduce the order at the current best price.* | *bid order*<br>$O_{bid}: \{piece, price\}_{C_i}$<br>• piece, the index of the piece requested<br>• price, the price at which $C_i$ is paying for one retrieval<br><br>*ask order*<br>$O_{ask}: \{piece, price\}_{M_j}$<br>• piece, the index of the piece requested<br>• price, the price at which $M_j$ is serving the piece for<br><br>*deal order*<br>$O_{deal}: \{ask, order\}_{C_i, M_j}$<br>• ask, a cryptographic reference to $O_{ask}$ from $C_i$<br>• order, a cryptographic reference to $O_{bid}$ from $C_i$<br><br>*Only pieces stored in Filecoin can be requested* |

FIG. 10

Storage Market Protocol

Order Matching

1. Storage Miner $M_i$ and Client $C_j$ add orders to the OrderBook:
   (a) $M_i$ creates $O_{ask}^1, O_{ask}^2, ...$ and $C_j$ creates $O_{bid}^1, O_{bid}^2, ...$
   (b) Orders are submitted to the blockchain via Put.addOrders($O^1, O^2, ..$).
   (c) On success, the orders are added to the OrderBook, the funds from $C_j$ are deposited and the space from $M_i$ is reserved.

2. When orders match, involved parties jointly create $O_{deal}$ and add it to the OrderBook:
   (a) $M_i$ and $C_j$ independently query the OrderBook via Put.matchOrders($O$).
   (b) If $M_i$ and $C_j$ have matching orders :
      • $C_j$ sends the piece $p$ to $M_i$ via Put.SendPiece($O_{bid}, O_{ask}, p$)
      • $M_i$ receives the piece $p$ from $C_j$ via Put.ReceivePiece($O_{bid}, O_{ask}, p$)
      • $M_i$ signs $O_{deal}$ and sends it to $C_j$
   (c) $C_j$ signs $O_{deal}$ and adds it to the OrderBook via Put.addOrders($O_{deal}$)

Settlement

3. The Network checks if the Storage Miners are correctly storing the pieces:
   (a) When a Storage Miner fills a sector, they seal it (they create a unique replica) via Manage.SealSector and submit the proof $r_{SEAL}$ and $\pi$ to the blockchain.
   (b) Storage Miners generate new proofs at every epoch and add them to the Filecoin blockchain every $\Delta_{proof}$ epochs via Manage.ProveSectors.
   (c) The Network runs Manage.RepairOrders at every epoch. If proofs are missing or invalid, the network tries to repair in the following ways:
      • if any proofs are missing or invalid, it penalizes the Storage Miners by taking part of their collateral,
      • if a large amount of proofs are missing or invalid for more than $\Delta_{fault}$ epochs, it considers the Storage Miner faulty, settles the order as failed and reintroduces a new order for the same piece into the the market,
      • if every Storage Miner storing this piece is faulty, then the piece is lost and the client gets refunded.

4. When the time of the order is expired or funds run out, if the service was correctly provided, the Network processes the payments, and removes the orders.

FIG. 11

Retrieval Market Protocol

Order Matching:

1. Retrieval Miners and Clients add orders to the Get.OrderBook:

(a) Retrieval Miners $M_i$ creates ask orders ($O_{ask}^1$, $O_{ask}^2$, ...) and Client $C_j$ creates bid orders ($O_{bid}^1$, $O_{bid}^2$, ...).

(b) Both $M_i$ and $C_j$ gossip their orders in the Filecoin network via Get.addOrders (c) Since there is no commonly shared orderbook, when users receive orders, they add them to their own orderbook's view. Differently from the Storage Market, these orders are not binding and no recourse is committed (e.g. clients don't do any deposit).

2. When orders match, involved parties jointly create $O_{deal}$ and add it to the Get.OrderBook:

(a) Retrieval Miner $M_i$ and Client $C_j$ independently run Get.matchOrders that queries their own current Get.OrderBook view.

(b) Both $M_i$ and $C_j$ sign $O_{deal}$ and add it to their Get.OrderBook via Get.addOrders (as described below)

(c) $C_j$ and $M_i$ setup a micropayment channel for $O_{deal}$

Settlement:

3. Both parties check whether the piece has been delivered:

(a) $M_i$ sends the piece $p$ in parts via Get.SendPiece (b) $C_j$ receives the $p$ in parts and for each part, $C_j$ acknowledges delivery by sending a micropayment via Get.ReceivePiece 4. When the $p$ has been received by $C_j$, $M_i$ can present the micropayments to the network and retrieve the payment, both parties remove their orders from the orderbooks.

FIG. 12

PROTOCOLS FOR DECENTRALIZED NETWORKS

CROSS-REFERENCE TO RELATED APPLICATIONS

This application is a continuation of, and claims priority to U.S. patent application Ser. No. 16/866,370, for Protocols for Decentralized Networks, to Nicola Greco and Juan Batiz-Benet, filed on May 4, 2020, which is a continuation-in-part of, and claims priority to U.S. patent application Ser. No. 16/195,536, filed on Nov. 19, 2018, which claims the benefit of the filing date of: U.S. Patent Application No. 62/697,123, filed on Jul. 12, 2018; U.S. Patent Application No. 62/697,091, filed on Jul. 12, 2018; and U.S. Patent Application No. 62/697,097, filed on Jul. 12, 2018, all of which are incorporated by reference herein in their entirety. This application is also a continuation-in-part of, and claims priority to, U.S. patent application Ser. No. 16/726,520, for Protocols for Decentralized Networks, to Nicola Greco and Juan Batiz-Benet, filed on Dec. 24, 2019, which is a continuation-in-part application of, and claims priority to, U.S. patent application Ser. No. 16/195,621 for Protocols for Decentralized Networks to Nicola Greco and Juan Batiz-Benet, filed on Nov. 19, 2018 which claims the benefit of the filing date of U.S. Patent Application No. 62/901,207, for Protocols for Decentralized Networks, which was filed on Sep. 16, 2019, all of which are incorporated here by reference in their entirety. For the avoidance of doubt, the disclosure of the all of the foregoing applications are incorporated here by reference in their entirety.

TECHNICAL FIELD

This specification relates to distributed computing systems.

BACKGROUND

A distributed computing system can serve as a decentralized data storage system with data replicated and synced across multiple computing nodes. A blockchain is a continuously growing list of data records linked and secured using cryptographic technology. A blockchain can be managed by a distributed computing system, i.e., a blockchain network, with each computing node in the distributed computing system adhering to a consensus protocol for inter-node communication and new block validation.

SUMMARY

This specification describes technologies for proving in a distributed computing system that one computing node has stored specified data for a specified time period. These technologies generally involve a task-performing computing node generating a proof and the distributed computing system verifying the proof and awarding the task-performing computing node. As one example, Filecoin is a protocol token whose blockchain runs on a proof, called Proof-of-Spacetime, where blocks are created by miners that are storing data. Filecoin protocol provides a data storage and retrieval service via a network of independent storage providers that does not rely on a single coordinator, where: (1) clients pay to store and retrieve data, (2) storage miners earn tokens by providing storage and (3) retrieval miners earn tokens by serving data.

In general, one innovative aspect of the subject matter described in this specification can be embodied in methods that include the actions of: (i) receiving, at a prover (e.g., a storage provider), an initial input challenge; (ii) producing, at the prover, an output proof, wherein producing the output proof includes: (a) producing, at the prover, an initial proof responsive to the initial input challenge, the initial proof proving that the prover is storing specified data; (b) generating, at the prover, a new input challenge based at least in part on the initial proof; (c) producing, at the prover, a new proof responsive to the new input challenge, the new proof proving that the prover is storing the specified data; and (d) repeating, at the prover, the generating step and the producing a new proof responsive to the new input challenge step a number of times, the repeating step creating sequential proofs of storage proving that the prover has access to specified data for at least a specified period of time, wherein each generating step is based at least in part on a most recent new proof, (iii) forwarding the output proof (e.g. to a blockchain); and (iv) receiving, at a prover, a response, e.g., tokens, at least in part in response to forwarding the output proof.

These methods can use a variety of proofs of storage. These methods can also be used with a variety of proofs of retrievability. In proving that the prover has access to specified data for at least a specified period of time, the specified period of time can be any length; a verifier can make the period longer if the verifier wants to reduce communication with the prover. The prover can generate a proof of spacetime and then submit on chain (to the blockchain) the proof along with an identifier for the prover's identity and for the data the prover is claiming to store (e.g., a cryptographic commitment to the data the prover is claiming to store).

Once the response (e.g, an output proof) is added to the allocation table of the blockchain, an award can be provided to the prover/storage miner. The decentralized network can determine and process the award in a variety of ways. In Filecoin: a miner can create a "deal" with a client, where the client promises that a specified amount of money will unlock at every proof they provide. This basically represents the reward for storing users data and is agreed upon by the client and the miner. This can be implemented via a smart contract or through payment channels (using payment channels can be easier logistically). In the case of the contract, the contract can state the following: if a correct proof is seen in the range of blocks X, X+allowed_delay, then the miner is given the money locked in the contract. In the case of the payment channel: the client gives to the miner a signed statement which says that if the miner has a proof at the right time on chain between time X, X+allowed time, then the miner can unlock some money locked by the client in the payment channel.

What is discussed immediately above are storage rewards. The method can also provide block rewards. The network can have a power table and when a miner submits a proof of replication, new power is added to the power table. In one implementation, every specified period of time, a miner must submit a proof of space time to the blockchain to maintain the power with which the prover started. If the prover stops doing so, the prover loses power. At every block, a miner is sampled from the power table. The sampled miner wins the block reward. This reward is implemented via a consensus rule.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The output proof can be labeled with a loop counter index. The method can further include checking, at a verifier, if the prover is storing the specified data for at least a minimum period of time. Receiving a response to adding the output proof can include receiving at a prover a stake in management of a file storage system and/or receiving specified benefits. The output proof can be a sequence of consecutive proofs, which can be referred to as a proof chain. An input challenge has a timestamp from the chain. The output proof is posted on chain and hence time stamped by the chain, again. The type and frequency of input challenges can be specified during a setup process by the prover and the verifier.

The setup process for Filecoin takes place in a context where a prover is a miner and the verifier is the blockchain. There is a client that indicates that it needs to see one proof every specified number of blocks in order to provide rewards. Then the blockchain verifies that such proofs are being received as required. In some implementations, e.g., in filecoin, the client does not pay a verifier, although there could be systems where this is the case. Rather in Filecoin, the client pays a primary miner and the primary miner pays any other miners that participate in the proof.

In general, another innovative aspect of the subject matter described in this specification can be embodied in methods that include the actions of: (i) receiving data at a prover; performing a seal operation on the data; (ii) receiving, at the prover, an initial input challenge; (iii) producing an output proof, wherein producing the output proof comprises: (a) producing an initial proof responsive to the initial input challenge, the initial proof proving that the prover is storing specified data; (b) generating a new input challenge based at least in part on the initial proof, (c) producing a new proof responsive to the new input challenge, the new proof proving that the prover is storing the specified data; and (d) repeating the generating step and the producing a new proof responsive to the new input challenge step a specified number of times resulting in an output proof, wherein the generating a new input challenge is based at least in part on a most recent new proof, wherein performing the seal operation is several orders of magnitude slower than producing an output proof, (iv) forwarding the output proof to a blockchain; and (v) receiving a response, e.g., tokens at least in part based on forwarding the output proof to the blockchain. A seal is the slow sequential encoding of the proof of replication. The proof of the proof of replication proves that the seal hash been done correctly.

Receiving an input challenge can include receiving an input challenge at a start time, and the input challenge can have a time stamp indicating the start time. The output proof can also have a time stamp indicating an approximation for the time that the blockchain receives the output proof. A third-party service can provide the time-stamp for the start time and for the approximate time that the blockchain receives the output proof. The time stamp for the input challenge can be based on the time the third party service receives the input challenge and the time stamp for approximate time the blockchain receives the output proof can be based on the time the third party service receives the proof result. The seal operation can be selected to last at least a minimum seal time and the method can further include determining that a time period between the start time timestamp and the output proof time-stamp is less than the minimum seal time. By requiring that the prover provide an output proof in less time than the minimum seal time, a proof of spacetime protocol prevents certain types of malicious behavior such as performing a seal operation only upon receipt of the challenge.

The subject matter described in this specification can be implemented in particular embodiments so as to realize one or more of the following advantages. A distributed computing network described in this specification can reliably and quickly verify that a task-performing node has stored specified data for a specified time period and participants can verify such storage in the distributed computing network (without requiring the intervention of a third-party verifier that is not a participant in the distributed computing network and that does not use an implementation of the verification protocols described in this specification). Such a so-called proof-of-spacetime facilitates the operation of a decentralized storage network which can utilize vast otherwise unused resources, e.g., storage resources. Proof-of-spacetime also facilitates useful work proofs in a blockchain context increasing the usefulness of blockchain technology. Proof-of-spacetime can be used to facilitate establishing consensus in a blockchain context. Proof of spacetime in the cloud setting can provide storage guarantees to clients. Proof of spacetime can provide a proof of work (beyond blockchain) as an anti-spam technique (e.g. in order to send an email, an entity needs to prove it had some specified data for some time, e.g., for a specified period of time). Proof-of-spacetime and other methods described in this specification are useful to reduce the effectiveness of attacks that malicious miners might try to exploit, e.g., Sybil, outsourcing, and generation attacks (described further below).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1B is an example of a decentralized storage network protocol.

FIG. 4 illustrates examples of proof-of-replication and proof-of-spacetime protocols.

FIG. 5 illustrates an example of data structures in a decentralized storage network (DSN) scheme.

FIG. 6 illustrates an example execution of a Filecoin DSN, grouped by party and sorted chronologically by row.

FIG. 7 illustrates examples of the put and get protocols in a Filecoin DSN.

FIG. 8 illustrates example of the manage protocol in a Filecoin DSN.

FIG. 9 illustrates an example generic protocol for a verifiable market/exchange.

FIG. 10 illustrates an example of order data structures for retrieval and storage markets/exchanges.

FIG. 11 illustrates an example of a detailed storage market/exchange protocol.

FIG. 12 illustrates an example of a detailed retrieval market/exchange protocol.

Like reference numbers and designations in the various drawings indicate like elements.

DETAILED DESCRIPTION

Figure 1A:
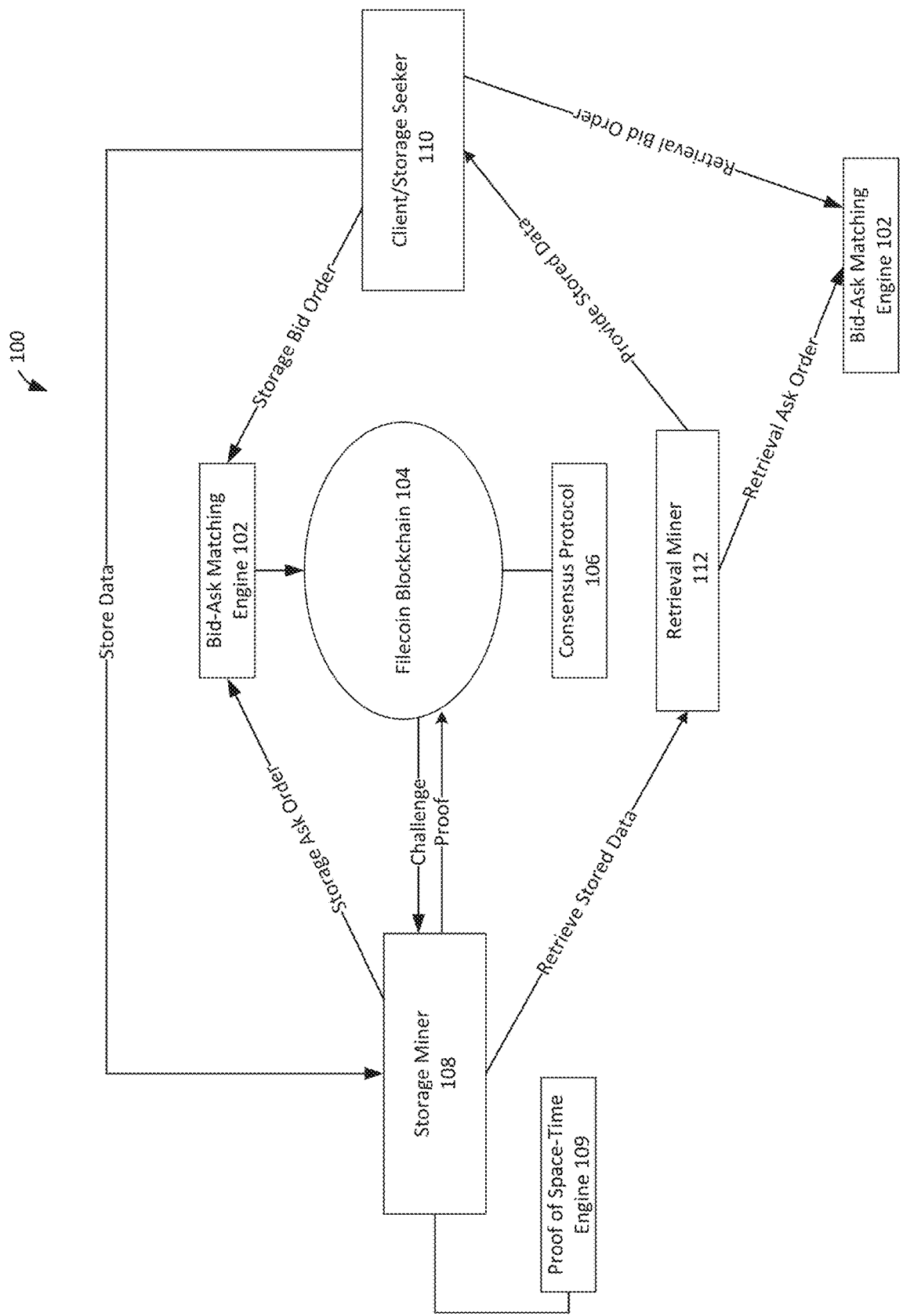
FIG. 1A is a schematic depiction of an example distributed computing system.

This specification relates to technologies for proving in a distributed computing system that one computing node has stored specified data for a specified time period. These technologies further relate to a task-performing computing node generating a proof of performance of the task, e.g., a proof of storage, and the distributed computing system verifying the proof and awarding the task-performing computing node. As one example, Filecoin protocol is a protocol utilizing a blockchain that runs on a proof, called Proof-of-Spacetime, where blocks are created by miners that are storing data. The Filecoin protocol provides a data storage and retrieval service via a network of independent storage providers that does not rely on a single coordinator, where: (1) clients reward storage providers/storage miners and storage retrievers/retrieval miners for storing and retrieving data, (2) storage miners earn tokens by providing storage and (3) retrieval miners earn tokens by retrieving data. Storage miners can also earn rewards (e.g., tokens) for participating in a consensus process, e.g., in a consensus process based on storage provided by miners.

The Filecoin protocol builds upon four components (this specification contemplates other protocols as well as variations on these components):

1. A Decentralized Storage Network (DSN) is a network of independent storage providers that offer storage and retrieval services. The Filecoin protocol is an incentivized, auditable and verifiable DSN construction. A decentralized network reduces or eliminates the networks reliance on a single coordinator (e.g., a single computing node) for at least a primary function of the network.
2. Proofs-of-Storage: The Filecoin protocol utilizes two Proofs-of-Storage: (1) Proof-of-Replication allows storage providers to prove that data has been replicated to its own uniquely dedicated physical storage. Enforcing unique physical copies enables a verifier to check that a prover is not deduplicating multiple copies of the data into the same storage space; (2) Proof-of-Spacetime allows storage providers to prove they have stored specified data throughout a specified amount of time.
3. Verifiable Exchanges: The Filecoin protocol models storage requests and retrieval requests as orders in two decentralized verifiable exchanges operated by the Filecoin network. Verifiable exchanges ensure that rewards are distributed when a service has been correctly provided. The Storage Exchange and the Retrieval Exchange allow miners and clients to submit storage and retrieval orders, respectively.
4. Useful Proof-of-Work: This specification describes how to construct a useful Proof-of-Work based on Proof-of-Spacetime that can be used in consensus protocols. Miners do not need to spend wasteful computation to mine blocks, but instead store data in the network to do so.

The Filecoin protocol is a DSN construction built on a blockchain and with a native token, i.e., the Filecoin token. Clients use tokens for storing and retrieving data. Miners earn tokens by storing and serving data. The Filecoin DSN handles storage and retrieval requests respectively via two verifiable exchanges: the Storage Exchange and the Retrieval Exchange. Clients and miners set the values for the services requested and offered and submit their orders to the exchanges.

The Filecoin network operates the exchanges which employ Proof-of-Spacetime and Proof-of-Replication to guarantee that storage miners have correctly stored the data they committed to store. Finally, miners can participate in the creation of new blocks for the underlining blockchain. In one embodiment, the probability of a candidate miner being a miner that can create a new block is proportional to the candidate miner's assigned storage. Assigned storage is indicated at least in part by the candidate miner's proof of work, e.g., the candidate miner's proof of the amount of its storage currently in use in the network. Stated differently, the probability of a storage miner being selected (by a selection protocol) to create a new block in the blockchain is proportional to the amount of storage currently being provided by the storage miner via the DSN. In other implementations, the probability of a storage miner being selected can take into account the storage miner's storage over a period of time.

FIG. 1A is a schematic depiction of one example of a Filecoin DSN 100. The illustrated Filecoin DSN 100 includes a bid-ask matching engine 102, a Filecoin blockchain 104, a consensus protocol 106 for maintaining the Filecoin blockchain/DSN 104, a plurality of computing nodes serving as a storage seeker/client 110, a storage provider/storage miner 108 connected/including a proof of Space-Time Engine 109, and a storage retriever/retrieval miner 112. Each of the plurality of computing nodes in the Filecoin DSN 100 can take on one or more roles as the client 110, the storage miner 108, and/or the retrieval miner 112.

At step A, the client/storage seeker 110 can submit a storage bid order (e.g., specifying terms that the client is willing to provide in order for a storage miner to store specified data for a specified time) to a bid-ask matching engine 102. At step B, the storage miner 108 can submit a storage ask order (e.g., indicating the amount of storage in can provide for at least one specified time period for a specified reward) to the bid-ask matching engine 102. Steps A and B do not have to occur in order. At step C, the bid-ask matching engine 102 determines if there is a matching client bid/storage miner ask. If there is a match, the bid-ask matching engine can create a deal and (as described further below) the storage miner who submitted the ask and the client who submitted the bid can sign the deal. When the deal is signed by both the relevant storage miner and the relevant client, the signed deal can be recorded on the blockchain. At step D, the agreed upon data is transmitted (e.g., from the client 110 to the storage miner 108) for storage. Alternatively, the bid-ask matching engine, upon determining that there is a matching client bid and storage miner ask, can instruct the relevant client to send the relevant storage miner client data. The storage miner can then check if the received data is of the right size as specified in the storage bid order. If the received data is of the right size, the storage miner can sign the order (which can then be referred to as a deal order), transmit the deal order to the blockchain, and store the data.

At step E, a verifier on the DSN 100 (shown in FIG. 1 as residing in element 104) can issue a challenge to the storage miner 108. In response to the challenge, at step F, the storage miner 108 can provide a proof back to the verifier on the DSN 100. In an alternative embodiment, the storage miner does not require a challenge to provide the proof.

Similarly to the storage scenario described above, at step G, a client 110 can submit a retrieval bid order to the bid-ask matching engine 102 and a retrieval miner 112 can submit a retrieval ask order to bid-ask matching engine 102. If there is a match, at step I the retrieval miner 112 can retrieve the stored data from the storage miner 108 and, at step J, the retrieval miner 112 can provide the stored data to the client 110.

In one implementation, each of the plurality of computing nodes, e.g., client 110, the storage miner 108, and/or the retrieval miner 112, is connected to every other computing node in the Filecoin DSN 100. For example, the client 110, the storage miner 108, and/or the retrieval miner 112 can be connected using wired or wireless connections such as Ethernet, WLAN, Bluetooth, and WiFi.

The client 110, the storage miner 108, and the retrieval miner 112 each includes one or more processors programmed to execute a set of commands according to a Filecoin protocol. The Filecoin protocol specifies actions each computing node is programmed to take such as submitting a storage request, submitting a storage offer, submitting a retrieval request, and submitting a retrieval offer.

The storage miner 108 includes one or more memory devices that can store, replicate, and return data per requests from the client 110 or the retrieval miner 112. The memory devices can be divided into sectors and each sector can be sealed when storing a piece of data. This specification may refer to data as data, piece of data or piece interchangeably. Sealing is described below.

The Filecoin DSN 100 includes a Filecoin blockchain 104. The Filecoin blockchain 104 can be an immutable, append-only linked list of blocks. Each block can record the distribution of Filecoin tokens, the proposed and completed transactions, currently open storage/retrieval orders, and proofs of completed orders submitted at a specific time. The Filecoin blockchain 104 is used to implement a ledger-based reward system, with the storage provider 108 rewarded for successfully storing data from the client 110. Each computing node in the Filecoin DSN can keep a local copy of the Filecoin blockchain. In an alternative embodiment, each miner or full node keeps a local copy of the Filecoin blockchain.

In one embodiment, when a change is made to the Filecoin blockchain, e.g., a new completed transaction, the change is broadcast to the entire Filecoin DSN and each local copy of the Filecoin blockchain is updated to reflect the change. An alternative embodiment can propagate changes only to a subset of nodes, or post a proof of correct changes.

FIG. 1B is an example of a decentralized storage network protocol, e.g., the Filecoin protocol. The Filecoin protocol includes a set of instructions that cause the Filecoin DSN 100, the client(s) 110, the storage miner(s) 108, and the retrieval miner(s) 112 to perform operations facilitating the storage/retrieval of data and the settlement of transactions in Filecoin tokens.

Network

The Filecoin DSN 100 comprises a plurality of computing nodes. In one embodiment, for each new block added to the Filecoin blockchain 104, the Filecoin DSN 100 is configured to check:
  (a) if the block is in the valid format
  (b) if all transactions contained in the block are valid
  (c) if all orders contained in the block are valid
  (d) if all proofs contained in the block are valid
  (e) if all pledges contained in the block are valid In one implementation, if any of the above conditions are not met, the block can be disregarded and not appended to the Filecoin blockchain 104.

In one embodiment, for each new order introduced to the Filecoin DSN 100, the Filecoin DSN 100 is configured to:
  (a) add the order to the Filecoin blockchain's orderbook
  (b) if the order is a storage bid order, lock the associated Filecoin tokens from the client 110
  (c) if the order is a storage ask order, lock the associated memory space from the storage miner
  (d) if the order is a deal order (e.g., a order for storage that has been agreed to by both a client and a storage miner), assign the data from the client 110 to the storage miner 108.

In one embodiment, for each order that has already been recorded in the Filecoin blockchain 104, the Filecoin DSN is configured to:
  (a) check if the order has expired or been canceled. For example, each order can have a time associated with the order. If the specified time runs out, the Filecoin DSN 100 can remove the order from the Filecoin blockchain 104, return unspent Filecoin tokens to the client, and free the space for the storage miner.
  (b) If the order is a deal order, check if the expected proofs have been generated by the storage miner. If any of the proofs are missing, the Filecoin DSN penalizes the storage miner by taking part of its pledged collateral (a storage miner can be required to commit collateral to the DSN as part of submitting a storage ask order to the DSN). If a large amount of proofs are missing, the Filecoin DSN can cancel the order and reintroduce the order to the market. In another example, if the data cannot be retrieved from the storage miner, the Filecoin DSN cancels the order and refunds the client.

Storage Miner

In one embodiment, at any time the storage miner 108 can execute the Filecoin protocol to perform the following example actions: (1) renew expired pledges by putting new collateral into the Filecoin blockchain, (2) pledge new storage, and (3) submit a new storage ask order to the Filecoin blockchain.

In one embodiment, for each storage ask order in the orderbook of the Filecoin blockchain 104, the storage miner 108 is configured to:
  (a) find matched storage bid orders from clients stored in the orderbook, and
  (b) start a deal order by contacting the matching client 110.

In one embodiment, for each sector of storage space pledged to the Filecoin blockchain 104, the storage miner 108 is configured to:
  (a) generate proofs of storage, and
  (b) at the appropriate time, post the proofs to the Filecoin blockchain 104.

In one embodiment, after a storage ask order is matched, the storage miner 108 receives data from the client 110. The storage miner 108 can then be configured to, as specified by the Filecoin protocol:
(a) check if the piece of data is of the right size as specified in the storage bid order
(b) create a deal order and sign the deal order, for example, by signing the order with a public key associated with the storage miner in the Filecoin DSN
(c) store the data in a sector of its storage space, and
(d) seal a sector if the sector is full.

Client

In one embodiment, at any time the client 110 can submit a new storage bid order to the Filecoin blockchain 104. The client 110 can further find one or more matching storage ask orders and send data to the matched storage miner 108.

After receiving a signed deal order from a storage miner 108, the client 110 can sign the deal order, e.g., using its own public key in the Filecoin DSN 100, and submit the signed deal order to the Filecoin blockchain 104.

In one embodiment, at any time the client 110 can submit a new storage retrieval order to the Filecoin blockchain 104. The client 110 can find one or more matching retrieval orders and create a Filecoin token payment channel with the retrieval miner 112.

After receiving data from the retrieval miner 112, the client 110 can verify the data and send Filecoin tokens as a reward to the retrieval miner 112.

Retrieval Miner

In one embodiment, at any time the retrieval miner 112 can submit a retrieval ask order to the Filecoin blockchain 104 and search for a matching retrieval bid order from the Filecoin blockchain 104.

In one embodiment, after matching a retrieval request from the client 110, the retrieval miner 112 is configured to:
(a) initiate a payment/reward channel with the client 110;
(b) retrieve specified data in multiple parts from the relevant storage miner, and
(c) send the data in parts to the client after receiving payment/reward for a respective part.

Storage Exchange and Storage Requests

With continued reference to FIG. 1, in one embodiment, the client 110 can store data using the Filecoin DSN 100 by rewarding a storage miner 108 in Filecoin tokens for storing specified client data. For example, the client 110 can submit a bid order according to the Filecoin protocol to a storage exchange orderbook. The storage exchange orderbook is part of the Filecoin blockchain and records the requests from all clients in the Filecoin DSN 100. For example, the bid order can include information such as the identity of the client 110 in the Filecoin DSN 100, the amount of data to be stored, the number of copies to be stored, the length of storage time, the maximum amount of Filecoin tokens to be awarded. The updated storage exchange orderbook will be broadcast to the Filecoin DSN 100 to be visible to participating computing nodes.

The storage miner 108 can earn Filecoin tokens specified in the bid order by fulfilling the bid order. To fulfill a bid order, the storage miner 108 first pledges to provide storage to the Filecoin DSN 100 according to the Filecoin protocol. For example, a pledge can include collateral in the form of Filecoin tokens. The collateral is deposited for the time intended to provide the service, and is returned to the storage miner 108 if the storage miner successfully fulfills the bid order, e.g., generating proofs of storage for the data it commits to store. If some proofs of storage fail, a proportional amount of the collateral will be lost. Generating proofs is explained below, e.g., with reference to FIG. 3. The pledges are recorded in the Filecoin blockchain 104 to be visible to computing nodes in the Filecoin DSN 100.

In one embodiment, once the pledge appears in the Filecoin blockchain 104, the storage miner 108 can submit an ask order to the DSN orderbook. In one embodiment order matching, pledges, and proofs are added on chain, meaning they are added to the blockchain. However parts of this protocol can be run off-chain using state channels and different trust assumptions (e.g. one embodiment of the protocol can elect a set of nodes to perform the verification tasks that blockchain nodes would have to do otherwise). There are at least two things that can be done off-chain: propagation of proofs/orders (one can propagate proofs/orders with traditional gossiping) and verification of correctness (as described above).

Similar to the bid order, the ask order can include the identity of the storage miner 108, the amount of storage the storage miner 108 offers, the length of the storage, and the asking award in Filecoin tokens. The bid-ask matching engine 102 periodically checks the current state of the ask orders from the client 110 and bid orders from the storage miner 108, and matches ask orders to bid orders where the ask order substantially satisfies the bid order.

Once the bid-ask matching engine matches an ask order and a bid order, a piece of data is sent from the client 110 to the storage miner 108 for the storage miner to store. Upon receiving the data, the storage miner performs a sealing operation to transform the received data into a replica, e.g., a unique physical copy of the data that is associated with an identity of the storage miner.

The sealing operation is a slow, sequential operation that is several orders of magnitude slower to perform compared to the proof generation operation. As a result, the storage miner 108, when requested to provide a proof of the storage, cannot generate a new replica on the fly since the expected time for a proof is much shorter than that the time to perform a sealing operation. For example, sealing can be realized using pre-existing techniques such as layering iterations of AES-256, Depth Robust Graphs, Slow Hash-functions (e.g. Sloth) to transform the received data into an encoded replica.

The deal order is submitted to the orderbook after the match. A network entity, e.g., the client/storage requester or the storage provider, can submit the order to the orderbook.

When the storage miner 108 is assigned the data, it can generate one or more proofs of replication (described further below) to indicate that the data is indeed being stored. The storage miner 108 posts a proof of storage on the Filecoin blockchain and other computing nodes in the Filecoin DSN 100 can verify the proofs. If a storage miner fails to generate a proof, or if a storage miner's proof is invalid, the storage miner 108 can be penalized (loss of tokens) and/or not rewarded. For example, in some embodiments, the storage miner 108 can lose all or part of its collateral.

Retrieval Exchange/Market and Retrieval Requests

In one embodiment, upon a request from a client 110, a retrieval miner 112 retrieves specified stored data from the storage miner 108 for the client 110 and is awarded Filecoin tokens.

The client 110 can submit a bid order to the retrieval market orderbook by broadcasting a request to the Filecoin DSN 100. The orderbook can be run off-chain by having nodes broadcasting orders.

The retrieval miner 112 submits a retrieval ask order to the same retrieval market orderbook by asking for a specified award in Filecoin tokens. When a matching bid-ask order is found, the client 110 receives the data from the retrieval miner 112. When the data is received, the client and the retrieval miner 112 sign a deal order and submit it to the Filecoin blockchain 104 to confirm that the exchange succeeded.

The bid-ask engine again monitors the orderbook and matches asks and bids for the retrieval exchange. Micro-awards are made once the bid-ask engine makes a match and the deal is completed (as described further below with reference to FIG. 2).

Figure 2:
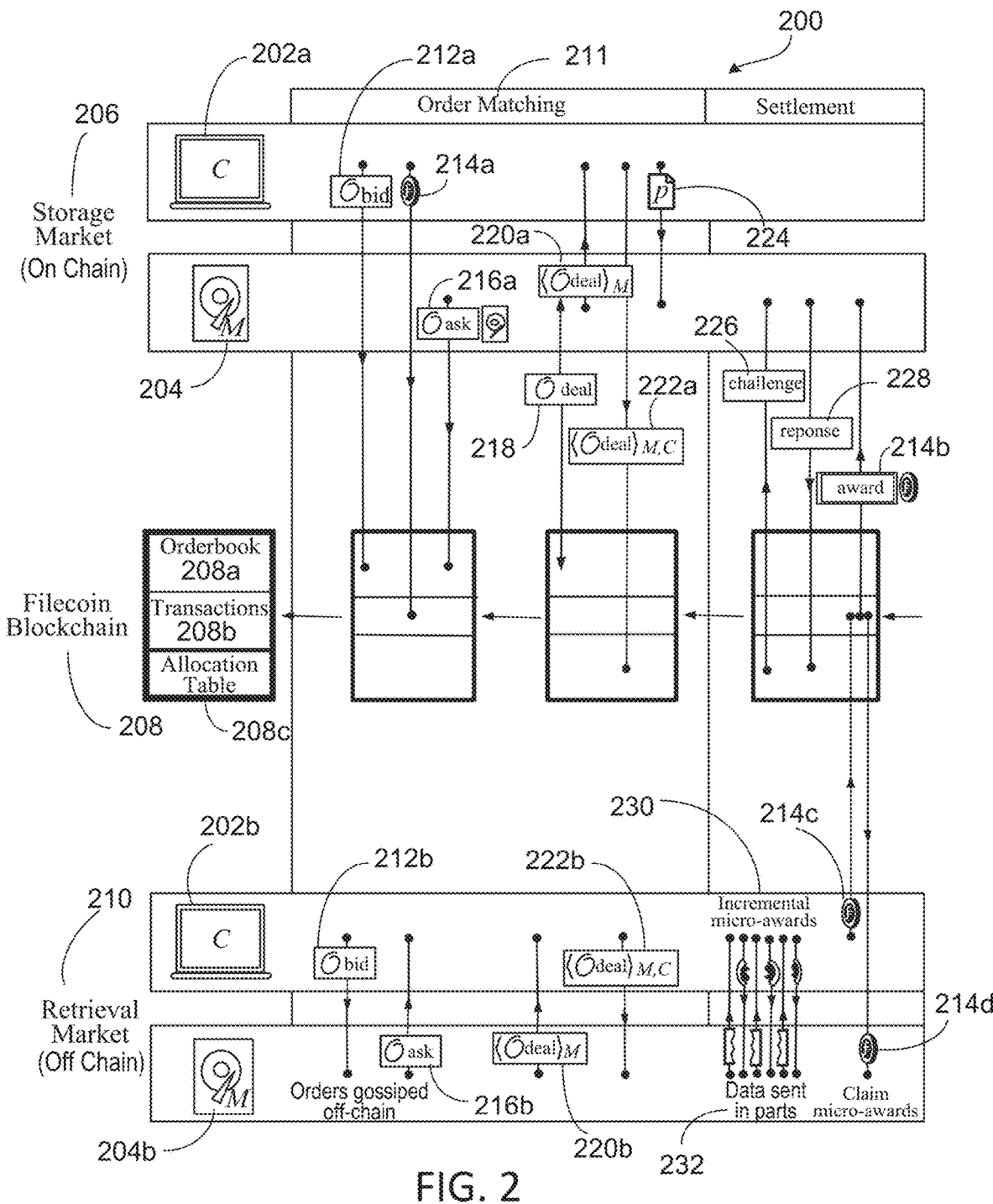
FIG. 2 is a schematic depiction of an example workflow for fulfilling a storage request in the distributed computing system.

Example Workflows FIG. 2 is a schematic depiction of an example workflow for fulfilling a storage request in a distributed computing system. For convenience, the process 200 will be described as being performed by a system of one or more computers, located in one or more locations, and programmed appropriately in accordance with this specification. For example, a distributed computing system, e.g., the Filecoin DSN system 100 of FIG. 1, appropriately programmed, can perform the process 200.

Stated differently, FIG. 2 is an illustration of one implementation of the Filecoin protocol, showing an overview of client (202a, 202b)-miner (204a, 204b) interactions. The storage market 206 and retrieval market 210 are shown above and below the blockchain 208, respectively, with time advancing from the order matching phase 211 on the left to the Settlement 213 phase on the right. The blockchain includes an orderbook 208a section, a transactions 208b section and an allocation table 208c section.

Turning first to order matching 211 for the storage market 206, a client 202a makes a storage bid order 212a that is recorded in the orderbook 208a. The client 202a also records filecoin from the client pursuant to the storage bid in the transactions section 208b of the blockchain 208. One or more storage miners 204a can also submit a storage ask order 216a to the orderbook 208a of the blockchain 208. For example, the storage miner 204a can first pledge its storage to the Filecoin DSN 100 (FIG. 1) by depositing collateral in Filecoin tokens according to a command specified in the Filecoin protocol. The pledge transaction is recorded on the Filecoin blockchain 208 and is visible to computing nodes in the Filecoin DSN 100 (FIG. 1). The collateral is deposited for the time intended to provide the storage service, and is provided back to the storage miner 204a if the storage miner 204a generates valid proofs of storage for the data it committed to store. If some proofs of storage fail, a proportional amount of the collateral is lost or given to the client 202a.

After the storage miner 204a completes the pledge transaction, the storage miner 204a can offer its storage to client 202a by submitting a storage ask order 216a to the Filecoin blockchain 208 according to a command specified in the Filecoin protocol. The storage ask order 216a is recorded in the orderbook 208a of the Filecoin blockchain 208 and is visible to computing nodes in the Filecoin DSN 100 (FIG. 1). The storage ask order 216a includes information such as the network identity of the storage miner 204, the amount of collateral, the storage space and length of time, and the asking price in Filecoin tokens.

With reference to FIG. 1, a bid-ask matching engine 102 can determine if there is an ask order from a storage miner that matches the client bid order, e.g., the engine 102 can determine if there is a storage miner that has submitted a qualifying ask order indicating the storage miner can store the data specified by the client under mutually agreeable terms. The matching can be performed by comparing one or more properties of the storage bid order 212a to one or more corresponding properties of one or more storage ask orders 216a.

With reference again to FIG. 2, the matched bid-ask deal 218 is logged in the orderbook 208a of the blockchain 208 and forwarded to miner 204a for signing. The storage miner signed deal 220a is then forwarded to the client 202a for signing. The storage miner and client signed deal 220a is then logged in the allocation table 208c of the blockchain 208 and a piece of data in question is transferred from the client 202a to the storage miner 206.

Turning to settlement 213 for the storage phase 206, for the storage miner 204 to receive an award 214b in Filecoin tokens for storing the data 224, the storage miner 204 can prove to the Filecoin DSN that it is correctly storing the data 224 through the agreed upon time period. The storage miner 204 seals a sector of its storage device, thus creating a unique replica of the data 224. A challenge 226 may issue to the storage miner 204 regarding a piece of data. In response to the challenge 226, the storage miner 204 generates a proof 228 and submits the proof to the Filecoin blockchain. The proof is recorded in an allocation table 208c. For example, the storage miner 204 can generate new proofs at every epoch and add them to the Filecoin blockchain using a command in the Filecoin protocol. As a result (e.g., if the response is verified), the award in filecoin 214b can be transferred to the storage miner 204a.

In one embodiment, the proofs are visible to the Filecoin DSN and can be checked by other computing nodes. If proofs are missing or invalid, the Filecoin DSN penalizes the storage miner 204 by taking part of the collateral. If a specified amount of proofs are missing or invalid for more than a specified period of time, the Filecoin DSN considers the storage miner 204 to be faulty, settles the order as failed, and reintroduces a new order for the same data into the Filecoin Blockchain 208.

In one embodiment, when the time of the order expires or when the amount of time paid for by the client 202a runs out, and the proof 228 is verified by the Filecoin DSN, the Filecoin DSN transfers the agreed amount of Filecoin tokens 214b to the storage miner 204 and removes the order from the Filecoin blockchain 208.

With regard to order matching 211 for retrieval 210, the client 202b can post a retrieval bid order, e.g., the client's retrieval bid order can be gossiped to a retrieval miner 204b off chain. Similarly, a retrieval miner 204b can post an ask order to a client 202b, e.g., a retrieval miner's ask order can be gossiped to a client 202b off chain. If there is a match between the client's retrieval bid order and the retrieval miner's ask order, the retrieval miner 204b can sign the deal 220b and the client 202b can sign the deal 222b.

Turning to the settlement 213 for the retrieval phase 210, the retrieval miner 204b can send the retrieved data 232 to the client 202b in parts and after each part is sent the client 202b can commit to micro-awards 230 for the retrieval miner 204b. Note that in one embodiment before micro-awards can be made for retrieval, the client locks the tokens for the microtransaction, e.g., the client indicates that the tokens are locked for use as a micro-award for a specified deal. Once the client 202b has received the specified data, the client 202b can log a filecoin transfer 214c with the transactions section 208b of the blockchain 208. Finally, the retrieval miner 204b can claim its filecoin award 214d.

Definition of a Decentralized Storage Network

This specification introduces the notion of a Decentralized Storage Network (DSN) scheme. DSNs aggregate storage offered by multiple independent storage providers and self-coordinate to provide data storage and data retrieval to clients. Coordination is decentralized and does not require trusted parties: the secure operation of these systems is achieved through protocols that coordinate and verify operations carried out by individual parties. DSNs can employ different strategies for coordination, including Byzantine Agreement, gossip protocols, or Conflict-free Replicated Data Types (CRDTs), depending on the requirements of the system. Later, this specification provides a construction for a Filecoin DSN.

Definition A DSN scheme is a tuple of protocols run by storage providers and clients:
(Put, Get, Manage)

Put(data)→key: Clients execute the Put protocol to store data under a unique identifier key.

Get(key)→data: Clients execute the Get protocol to retrieve data that is currently stored using a specified key.

Manage( ): The network of participants coordinates via the Manage protocol to: control the available storage, audit the service offered by providers and repair possible faults. The Manage protocol is run by storage providers often in conjunction with clients or a network of auditors.

In one embodiment, a DSN scheme guarantees data integrity and retrievability as well as tolerates management and storage faults defined in the following sections.

Fault Tolerance

For example, management faults can be defined to be byzantine faults caused by participants in a Manage protocol. A DSN scheme relies on the fault tolerance of its underlying Manage protocol. Violations on the fault tolerance assumptions for management faults can compromise liveness and safety of the system. For example, consider a DSN scheme, where the Manage protocol requires Byzantine Agreement (BA) to audit storage providers. In such a protocol, the network receives proofs of storage from storage providers and runs BA to agree on the validity of these proofs. If the BA tolerates up to f faults out of n total nodes, then one implementation of a DSN can tolerate f<n/2 faulty nodes. Violations of this assumption can compromise audits, i.e., a violation of this assumption can reduce an auditor's (or client's) confidence, e.g., in the relevant proof of storage over time.

Storage Faults

Storage faults can be defined to be byzantine faults that prevent clients from retrieving the data: i.e. Storage Miners lose their pieces (data) and/or Retrieval Miners stop serving pieces. A successful Put execution is (f, m)-tolerant if it results in its input data being stored in m independent storage providers (out of n total) and it can tolerate up to f byzantine providers. The parameters f and m depend on protocol implementation; protocol designers can fix f and m or leave the choice to the user, extending Put(data) into Put(data, f, m). A Get execution on stored data is successful if there are fewer than f faulty storage providers.

For example, consider a simple scheme, where the Put protocol is designed such that each storage provider stores all of the data. In this scheme m=n and f=m−1. Note that f=m−1 is not always true. Some schemes can be designed using erasure coding, where each storage provider stores a special portion of the data, such that x out of m storage providers are required to retrieve the data; in this case f=m−x.

Properties

In one embodiment, a DSN scheme can have two central properties, i.e., data integrity and retrievability, in addition to other properties.

The data integrity property states that no bounded (i.e., bounded in terms of time and storage resources) adversary A can convince clients to accept altered or falsified data at the end of a Get execution.

The DSN scheme provides data integrity if, for any successful Put execution for some data d under key k, there is no computationally-bounded adversary A that can convince a client to accept d', for d' not equal to d at the end of a Get execution for identifier k.

The retrievability property states that, given the fault-tolerance assumptions of the DSN scheme, if some data has been successfully stored in the DSN scheme and storage providers continue to follow the protocol, then clients can eventually retrieve the data.

The DSN scheme provides retrievability if for any successful Put execution for data under a key, there exists a successful Get execution for the key for which a client retrieves data.

In one embodiment, DSN schemes can provide other properties specific to their application. Three example properties required by the Filecoin DSN include: public verifiability, auditability, and incentive-compatibility.

For example, a DSN scheme is publicly verifiable if for each successful Put, the network of storage providers can generate a proof that the data is currently being stored. The Proof-of-Storage convinces any efficient verifier, where the verifier only knows a key associated with the data in question and does not have access to the data in question.

A DSN scheme can be auditable, for example, if it generates a verifiable trace of operation that can be checked in the future to confirm storage was indeed stored for the correct duration of time.

A DSN scheme can be incentive-compatible, for example, if storage/retrieval providers are rewarded for successfully offering storage and/or retrieval services, or penalized for misbehaving, such that the storage providers' dominant strategy is to store and/or retrieve data.

Proof-of-Replication and Proof-of-Spacetime

In the Filecoin protocol, storage providers/miners convince their clients that they stored the data they are being paid to store; in practice, storage providers generate Proofs-of-Storage (PoS) that the blockchain network (or the client itself) verifies.

This specification describes implementations for Proof-of-Replication (PoRep) and Proof-of-Spacetime (PoSt) schemes used in Filecoin.

Motivation

In one implementation, Proofs-of-Storage (PoS) schemes allow a user, e.g., the client, who outsources data to a server, e.g., the storage miner, to repeatedly check if the server is still storing the data outsourced to the server. The user can verify the integrity of the data outsourced to a server in a more efficient way than downloading the data. For example, the server can generate a probabilistic proof of possession by sampling a random set of blocks and transmitting a small amount of data in a challenge/response protocol with the user.

Provable data possession (PDP) and proof of retrievability (PoR) schemes only guarantee that a prover had possession of some data at the time of the challenge/response. In Filecoin, stronger proofs are useful to prevent three types of attacks that malicious miners might try to exploit in an effort to get rewarded for storage they are not providing: Sybil attacks, outsourcing attacks, generation attacks.

Sybil attacks: malicious miners can pretend to store (and get paid for) more copies than the ones physically stored by creating multiple sybil identities, but in fact storing the data only once.

Outsourcing attacks: malicious miners could commit to store more data than the amount they can physically store, relying on quickly fetching data from other storage providers.

Generation attacks: malicious miners could claim to be storing a large amount of data which they are instead efficiently generating on-demand using a small program. If the program is smaller than the purportedly stored data, this inflates the malicious miner's likelihood of winning a block reward in Filecoin, which (as described further below) can be proportional to the miner's storage currently in use.

Proof-of-Replication

Proof-of-Replication (PoRep) is a Proof-of-Storage which allows a server (i.e. the prover P) to convince a user (i.e. the verifier V) that some data D has been replicated to its own uniquely dedicated physical storage. The PoRep protocol is an interactive protocol, where the prover P: (a) commits to store n distinct replicas (physically independent copies) of some data D, and then (b) convinces the verifier V, that P is indeed storing each of the replicas via a challenge/response protocol. PoRep improves on PoR and PDP schemes, reducing/preventing Sybil Attacks, Outsourcing Attacks, and Generation Attacks.

Definition (Proof-of-Replication) A PoRep scheme enables an efficient prover P to convince a verifier V that P is storing a replica R, a physical independent copy of some data D, unique to P. A PoRep protocol is characterized by a tuple of polynomial-time algorithms:
(Setup, Prove, Verify)

PoRep:Setup($1^\lambda$, D)→R, $S_P$; $S_V$, where $S_P$ and $S_V$ are scheme-specific setup variables for P and V, and $\lambda$ is a security parameter. PoRep:Setup is used to generate a replica R, and give P and V the necessary information to run PoRep:Prove and PoRep:Verify.

Some schemes may require the prover or interaction with a third party to compute PoRep:Setup.

PoRep:Prove($S_P$, R, c)→|$\pi^c$, where c is a random challenge issued by a verifier V, and $\pi^c$ is a proof that a prover has access to R a specific replica of D. PoRep.Prove is run by P to produce a $\pi^c$ for V.

PoRep:Verify($S_V$, c, $\pi^c$)→{0, 1}, which checks whether a proof is correct. PoRep.Verify is run by V and convinces V whether P has been storing R.

Proof-of-Spacetime

Proof-of-Storage (PoS) schemes allow a user to check if a storage provider is storing the outsourced data at the time of the challenge. Ae user can repeatedly (e.g. every minute) send challenges to a storage provider in an attempt to determine that the storage provider is storing data at more times than at a single instance. However, the communication complexity required in such a scheme can be a bottleneck in systems such as Filecoin, where storage providers submit their proofs to the blockchain network.

To address this issue, one can use Proof-of-Spacetime, where a verifier can check if a prover is storing its outsourced data for at least a minimum period of time without having the user (e.g., a client or other verifier) being required to repeatedly send challenges to the storage provider over a period of interest. One intuition is to require the prover to (1) generate sequential Proofs-of-Storage (in one case Proof-of-Replication), as a way to determine time and (2) recursively compose the executions to generate a short proof.

Definition (Proof-of-Spacetime): A PoSt scheme enables an efficient prover P to convince a verifier V that P is storing some data D for some period of time t. A PoSt is characterized by a tuple of polynomial-time algorithms:
(Setup, Prove, Verify)

PoSt:Setup($1^\lambda$, D)→$S_P$, $S_V$, where $S_P$ and $S_V$ are scheme-specific setup variables for P and V, is a security parameter. PoSt:Setup is used to give P and V the necessary information to run PoSt:Prove and PoSt:Verify. Some schemes may require the prover or interaction with a third party to compute PoSt:Setup.

PoSt:Prove($S_P$, D, c, t)→$\pi^c$, where c is a random challenge issued by a verifier V, and $\pi^c$ is a proof that a prover has access to D for some period of time t. PoSt:Prove is run by P to produce a $\pi^c$ for V.

PoSt:Verify($S_V$, c, t, $\pi^c$)→{0, 1}, which checks whether a proof is correct. PoSt:Verify is run by V and convinces V whether P has been storing D for some period of time t.

Practical PoRep and PoSt

This specification describes practical PoRep and PoSt constructions that can be deployed in existing systems and do not rely on trusted parties or hardware. One construction for PoRep uses a very slow sequential computation Seal performed during Setup to generate a replica. The protocol sketches for PoRep and PoSt are presented in FIG. 4 and the underlying mechanism of the proving step in PoSt is illustrated in FIG. 3.

Figure 3:
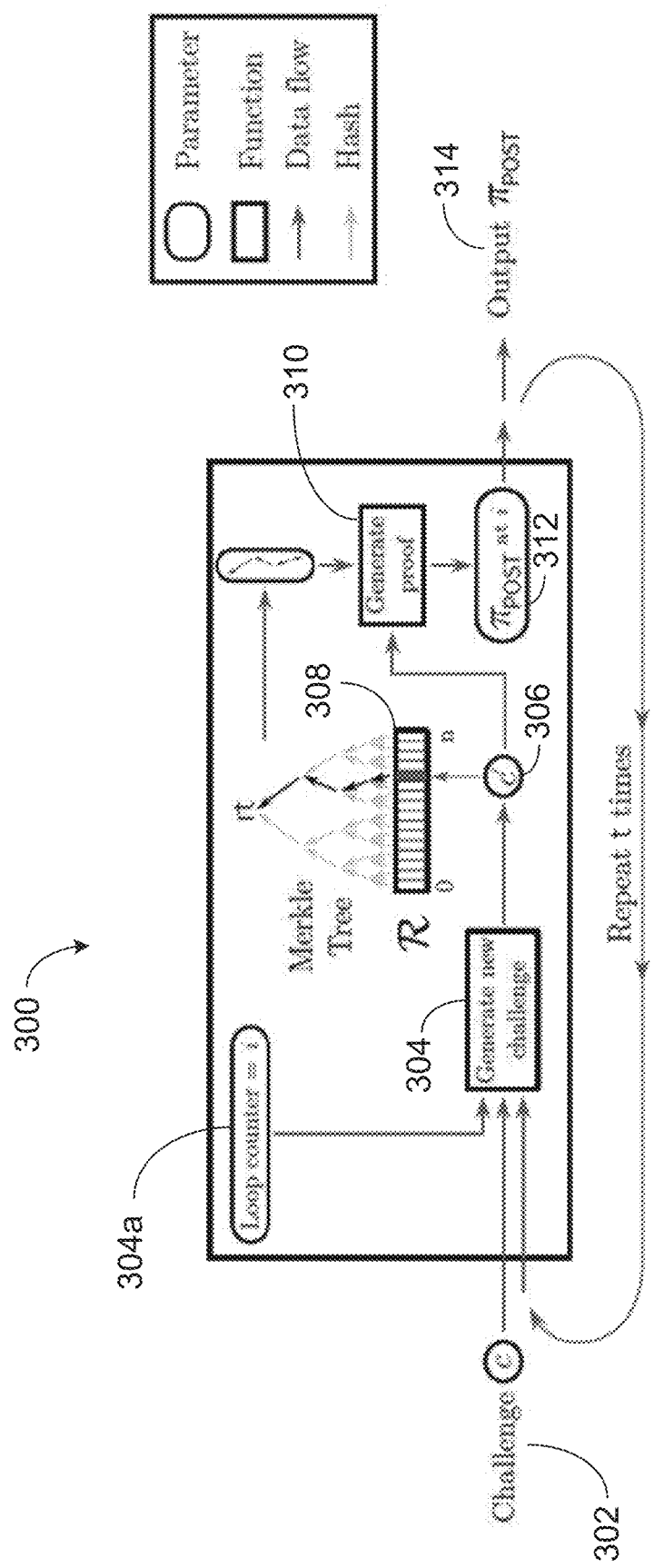
FIG. 3 is a schematic depiction of an example workflow for generating a space-time proof, e.g., at a prover.

More specifically, FIG. 3 is a schematic depiction of an example workflow for generating a space-time proof, e.g., at the storage miner 108 in FIG. 1A (also depicted as 204a in FIG. 2). FIG. 3 illustrates the underlying mechanism of PoSt.Prove showing an iterative proof to demonstrate storage over a period of time. Initially, an input challenge 302 is forwarded to a prover, e.g., from a verifier (FIG. 2 shows the challenge 226 coming from the allocation table of the blockchain). The proof of spacetime engine 300 at the prover receives an initial input challenge 302 at the new challenge generation engine 304. Given receipt of the initial input challenge, the new challenge generation engine 304 passes the initial input challenge on to proof generation engine 310 which generates a proof 312, e.g., an initial proof labelled to indicate that it is responsive to the initial challenge 302.

In some embodiments, the prover does not need to receive a challenge for the very first proof. In other words, some proof of replication schemes might be non-interactive, and thus do not need a challenge (for example, using fiat-shamir heuristics). The proof described can be interactive or non-interactive proofs (where the challenge for the first proof is not needed).

The initial proof is then fed back into the new challenge generator 304 to generate a new challenge 306. The process of feeding a proof back into the new challenge generator completes a loop of the proof of spacetime engine 300 and increments a loop counter 304a that also feeds into the new challenge generator 304 allowing the new challenge generator to label the challenge 306 with a loop counter index which in turn allows the proof generator 310 to label each output proof 312 with a loop counter index.

How often a verifier requests a proof can be dictated by the time that it takes to run a sealing process (e.g., to run the setup for the proof of replication). However, in a general setting (no proof of replication), the closer the requests, the higher the guarantees of files being stored through time. If one wants a file to be available every hour, then one can have a challenge per hour, if one want a file to be more regularly available, one can have a challenge every minute.

Cryptographic Building Blocks

Collision-resistant hashing. With continuing reference to FIG. 3, the proof-of-spacetime engine 300 can use a collision resistant hash function CRH: $\{0;1\}^* \to \{0,1\}^{O(\lambda)}$ The protocol can use a collision resistant hash function Merkle-CRH 308, which divides a string in multiple parts, constructs a binary tree and recursively applies CRH and outputs the root 309. The root 309 can then be an input into the proof generation engine 310.

zk-SNARKs. Implementations of PoRep and PoSt can rely on zero-knowledge Succinct Non-interactive ARguments of Knowledge (zk-SNARKs). Because zk-SNARKs are succinct, proofs are very short and easy to verify. More formally, let L be an NP (nondeterministic polynomial time) language and C be a decision circuit for L. A trusted party conducts a one-time setup phase that results in two public keys: a proving key pk and a verification key vk. The proving key pk enables any (untrusted) prover to generate a proof attesting that $x \in L$ for an instance x of her choice. The non-interactive proof $\pi$ is both zero-knowledge and proof-of-knowledge. A proof about some computation is zero knowledge if it doesn't leak any private input or intermediate steps. A malicious verifier can learn nothing beyond the output. A proof of knowledge is a proof where a prover can convince a verifier that they know of some witness. The prover needs to demonstrate that they have this knowledge. In a standard protocol, the prover can just send the witness to the verifier. In a zero-knowledge proof of knowledge, the prover proves that they have some knowledge without leaking what their knowledge is or any intermediate steps (in one case the knowledge is a file being stored). In certain implementations zero knowledge is not used. Anyone can use the verification key vk to verify the proof $\pi$; in particular zk-SNARK proofs are publicly verifiable: anyone can verify $\pi$, without interacting with the prover that generated $\pi$. The proof $\pi$ has constant size and can be verified within a time period that is linear in $|x|$.

A zk-SNARK for circuit satisfiability is a triple of polynomial-time algorithms
(KeyGen, Prove, Verify)

KeyGen($1^\lambda$, C)→(pk, vk). On input security parameter A and a circuit C, KeyGen probabilistically samples pk and vk. Both keys are published as public parameters and can be used to prove/verify membership in $L_C$.

Prove(pk, x, w)→$\pi$. On input pk and input x and witness for the NP-statement w, the prover Prove outputs a non-interactive proof $\pi$ for the statement $x \in L_C$.

Verify(vk, x, $\pi$)→{0, 1}. On input vk, an input x, and a proof $\pi$, the verifier Verify outputs 1 if $x \in L_C$.

Implementations of zk-SNARK systems are available. Generally these systems require the KeyGen operation to be run by a trusted party; work on Scalable Computational Integrity and Privacy (SCIP) systems can avoid this initial step.

Seal Operation

The role of the Seal operation is to (1) have replicas be physically independent copies by having provers store a pseudo-random permutation of D unique to their public key, such that committing to store n replicas results in dedicating disk space for n independent replicas (hence n times the storage size of a replica) and (2) to have the generation of the replica during PoRep:Setup take substantially longer than the time expected for responding to a challenge.

The above operation can be realized with an appropriate seal technique such as $Seal^T_{AES-256}$. $Seal^T_{AES-256}$ takes 10-100× longer than the honest challenge-prove-verify sequence. Note one can choose T such that running $Seal^T_{BC}$ is distinguishably more expensive than running Prove with random access to R.

Practical PoRep Construction

This section describes the construction of the PoRep protocol and includes a simplified protocol sketch in FIG. 4.

Creating a Replica. The Setup algorithm generates a replica via the Seal operation and a proof that it was correctly generated. The prover generates the replica and sends the outputs (excluding R) to the verifier.

Setup
  inputs:
    prover key pair ($pk_P$; $sk_P$)
    prover SEAL key $pk_{SEAL}$
    dataD
  outputs: replica R, Merkle root rt of R, proof SEAL Proving Storage. The Prove algorithm generates a proof of storage for the replica.

The prover receives a random challenge, c, from the verifier, which determines a specific leaf $R_C$ in the Merkle tree of R with root rt; the prover generates a proof of knowledge about R, and its Merkle path leading up to rt.

Prove
  inputs:
    prover Proof-of-Storage key $pk_{POS}$
    replica R
    random challenge c
  outputs: a proof $\pi_{POS}$ Verifying the Proofs. The Verify operation checks the validity of the proofs of storage given the Merkle root of the replica and the hash of the original data. Proofs are publicly verifiable: nodes in the distributed system maintaining the ledger and clients interested in particular data can verify these proofs.

Verify
  inputs:
    prover public key, $pk_P$
    verifier SEAL and POS keys $vk_{SEAL}$, $vk_{POS}$
    hash of data D, $h_D$
    Merkle root of replica R, rt
    random challenge, c
    tuple of proofs, ($\pi_{SEAL}$; $\pi_{POS}$)
  outputs: bit b, equals 1 if proofs are valid Practical PoSt Construction This section describes the construction of the PoSt protocol. A simplified protocol sketch is shown in FIG. 4. In one embodiment, the Setup and Verify operations are equivalent to those in the PoRep construction.

Proving space and time. The Prove algorithm generates a Proof-of-Spacetime for the replica. The prover receives a random challenge from the verifier and generates Proofs-of-Replication in sequence, using the output of a proof as an input of the challenge generation engine for a specified amount of iterations t (see FIG. 3).

Prove
  inputs:
    prover PoSt key $pk_{POST}$
    replica R
    random challenge c
    time parameter t
  outputs: a proof $\pi_{POST}$ Usage in Filecoin The Filecoin protocol can employ Proof-of-Spacetime to audit the storage offered by miners. To use PoSt in Filecoin, the scheme can be modified to be non-interactive. In a standard setting there is a prover and a verifier and the verifier sends challenges to the prover. in the filecoin setting, the prover can take challenges from the blockchain, so in such an embodiment the prover does not need to interact with the verifier (a non-interactive approach). Challenges can be generated using randomness from the blockchain.

FIG. 4 illustrates examples of proof-of-replication and proof-of-spacetime protocols. Here CRH denotes a collision-resistant hash, x is the NP-statement to be proven, and w is the witness.

Filecoin: a DSN Construction

The Filecoin DSN is a decentralized storage network that is auditable, publicly verifiable and designed on incentives. Clients pay a network of miners for data storage and retrieval; miners offer disk space and bandwidth in exchange for awards. Miners receive their awards only if the network can audit that their service was correctly provided.

In this section, the specification describes the Filecoin DSN construction, based on the DSN definition and Proof-of-Spacetime.

Setting

Participants

Any user can participate as a Client, a Storage Miner, and/or a Retrieval Miner in the Filecoin DSN.

Clients pay to store data and to retrieve data in the DSN, via Put and Get requests. Storage Miners provide data storage to the network. Storage Miners participate in Filecoin by offering their disk space and serving Put requests. To become Storage Miners, users pledge their storage by depositing collateral proportional to it.

Storage Miners respond to Put requests by committing to store the client's data for a specified time. Storage Miners generate Proofs-of-Spacetime and submit them to the blockchain to prove to the Network that they are storing the data through time. In case of invalid or missing proofs, Storage Miners can be penalized and loose part of their collateral. Storage Miners are also eligible to mine new blocks, and in doing so they receive a mining reward for creating a block and transaction fees for the transactions included in the block.

Retrieval Miners provide data retrieval to the Network. Retrieval Miners participate in Filecoin by serving data that users request via a Get request. Unlike Storage Miners, in one embodiment they are not required to pledge, commit to store data, or provide proofs of storage. It is natural for Storage Miners to also participate as Retrieval Miners. Retrieval Miners can obtain pieces directly from clients, or from the Retrieval Market.

The Network, N

In one embodiment, the system can personify all the users that run Filecoin full nodes as one single abstract entity: The Network. The Network acts as an intermediary that runs the Manage protocol; informally, at every new block in the Filecoin blockchain, full nodes manage the available storage, validate pledges, audit the storage proofs, and repair possible faults.

The Ledger

The Filecoin protocol is applied on top of a ledger-based token system, e.g., the Ledger, L. At any given time t (referred to as epoch), all users have access to $L_t$, the ledger at epoch t, which is a sequence of transactions. The ledger is append-only. The Filecoin DSN protocol can be implemented on ledgers that allows for the verification of Filecoin's proofs. In one embodiment, the protocol implements the ledger based on useful work.

The Markets

Demand for and supply of storage and retrieval meet at the two Filecoin markets/exchanges: Storage Market and Retrieval Market. The markets are two decentralized exchanges. Clients and miners set the prices for the services they request or provide by submitting orders to the respective markets. The exchanges provide a way for clients and miners to see matching orders and initiate deals. By running the Manage protocol, the Network provides rewards to miners and charges to clients if the service requested is successfully provided.

FIG. 5 illustrates an example of data structures in a decentralized storage network (DSN) scheme.

Data Structure

Pieces. A piece is some part of data that a client is storing in the DSN. For example, data can be deliberately divided into many pieces and each piece can be stored by a different set of Storage Miners.

Sectors. A sector is some disk space that a Storage Miner provides to the network. Miners store pieces from clients in their sectors and earn tokens for their services. In order to store pieces, Storage Miners must pledge their sectors to the network.

AllocationTable. The AllocTable is a data structure that keeps track of pieces and their assigned sectors. The AllocTable is updated at every block in the ledger and its Merkle root is stored in the latest block. In practice, the table is used to keep the state of the DSN, allowing for quick look-ups during proof verification. FIG. 5 illustrates an example of data structures in a decentralized storage network (DSN) scheme.

Orders. An order is a statement of intent to request or offer a service. Clients submit bid orders to the markets to request a service (respectively the Storage Market for storing data and the Retrieval Market for retrieving data) and Miners submit ask orders to offer a service. Examples of order data structures are shown in FIG. 10.

Orderbook. Orderbooks are sets of orders.

Pledge. A pledge is a commitment to offer storage (specifically a sector) to the network. A Storage Miner submits her pledge to the ledger in order to start accepting orders in the Storage Market. A pledge consists of the size of the pledged sector and the collateral deposited by the Storage Miner.

FIG. 6 illustrates an example execution of a Filecoin DSN, grouped by party and sorted chronologically by row.

Protocol

The clients, the Network, and the miners of the Filecoin DSN perform various operations. For example, the operations include the methods of the Get and the Put protocol an example of which is shown in FIG. 7 and the Manage protocol an example of which is shown in FIG. 8. An example protocol execution is shown in FIG. 6. An example of an overall Filecoin Protocol is shown in FIG. 1B.

Client Cycle

In one embodiment, the client can perform operations including storing data in Filecoin DSN and retrieving data from the Filecoin DSN.

1. Put: Client stores data in Filecoin.

Clients can store their data by paying Storage Miners in Filecoin tokens. The Put protocol is described below.

A client initiates the Put protocol by submitting a bid order to the Storage Market orderbook (by submitting its order to the blockchain). When a matching ask order from miners is found, the client sends the piece of data to the miner. Both parties sign a deal order and submit it to the Storage Market orderbook.

Clients should be able to decide the amount of physical replicas of their pieces either by submitting multiple orders (or specifying a replication factor in the order). Higher redundancy results in a higher tolerance of storage faults.

2. Get: Client retrieves data from Filecoin.

Clients can retrieve any data stored in the DSN by awarding Retrieval Miners in Filecoin tokens. The Get protocol is described below.

A client initiates the Get protocol by submitting a bid order to the Retrieval Market orderbook (by gossiping their order to the network). When a matching ask order from miners is found, the client receives the piece from the retrieval miner. When received, both parties sign a deal order and submit it to the blockchain to confirm that the exchange succeeded.

Mining Cycle (for Storage Miners)

1. Pledge: Storage Miners pledge to provide storage to the Network.

Storage Miners pledge their storage to the network by depositing collateral via a pledge transaction in the blockchain, via Manage:PledgeSector. Storage miners deposit collateral for the time intended to provide the service, and the collateral is returned if the miner generates proofs of storage for the data the miner commit to store. If some proofs of storage fail, a proportional amount of collateral is lost.

Once the pledge transaction appears in the blockchain, miners can offer their storage in the Storage Market: a storage miner can set its price and add an ask order to the market's orderbook.

Manage:PledgeSector
    inputs:
        current allocation table allocTable
        pledge request pledge
    outputs: allocTable'

2. Receive Orders: Storage Miners get storage requests from the Storage Market.

Once the pledge transaction appears in the blockchain (e.g., in the AllocTable), miners can offer their storage in the Storage Market: a storage miner can set its price and add an ask order to the market's orderbook via Put:AddOrders.

Put:AddOrders
    inputs: list of orders $O^1 \ldots O^n$
    outputs: bit b, equals 1 if successful Check if ask orders are matched with a corresponding bid order from a client, via Put:MatchOrders.

Put:MatchOrders
    inputs:
        the current Storage Market OrderBook
        query order to match $O^q$
    outputs: matching orders $O^1 \ldots O^n$ Once orders are matched, clients send their data to the Storage Miners. When receiving the piece, miners run Put:ReceivePiece. When the data is received, both the miner and the client sign a deal order and submit it to the blockchain.

Put:ReceivePiece
    inputs:
        signing key for $M_j$.
        current orderbook OrderBook
        ask order $O_{ask}$
        bid order $O_{bid}$
        piece p
    outputs: deal order $O_{deal}$ signed by $C_i$ and $M_j$ 3. Seal: Storage Miners prepare the pieces for future proofs.

Storage Miners' storage is divided in sectors, each sector contains pieces assigned to the miner. The Network keeps track of each Storage Miners' sector via the allocation table. When a Storage Miner sector is filled, the sector is sealed. Sealing is a slow, sequential operation that transforms the data in a sector into a replica, a unique physical copy of the data that is associated to the public key of the Storage Miner. In one implementation sealing is an operation used for Proof-of-Replication.

Manage:SealSector
    inputs:
        miner public/private key pair M
        sector index j
        allocation table allocTable
    outputs: a proof $\pi_{SEAL}$, a root hash rt 4. Prove: Storage Miners prove they are storing the committed pieces.

When Storage Miners are assigned data, they must repeatedly generate proofs of replication to guarantee they are storing the data. Proofs are posted on the blockchain and the Network verifies them.

Manage: ProveSector
    inputs:
        miner public/private key pair M
        sector index j
        challenge c
    outputs: a proof $\pi_{POS}$ Mining Cycle (for Retrieval Miners)

In one embodiment, the retrieval miners can perform operations including receiving orders and sending pieces to clients.

1. Receive Orders: Retrieval Miners get data requests from the Retrieval Market.

Retrieval Miners announce their pieces by gossiping their ask orders to the network: A Retrieval Miner set its price and adds an ask order to the market's orderbook.

Get:AddOrders
    inputs: list of orders $O_1 \ldots O_n$
    outputs: none

Then, the Retrieval Miner checks if its orders are matched with a corresponding bid order from a client.

Get:MatchOrders
    inputs:
        the current Retrieval Market OrderBook
        query order to match $O^q$
    outputs: matching orders $O^1 \ldots O^n$ 2. Send: Retrieval Miners send pieces to the client.

Once orders are matched, Retrieval Miners send the requested piece to the client. When the client receives the piece, both the miner and the client sign a deal order for the requested piece of data and submit the signed deal order to the blockchain.

Put:SendPiece
    inputs:
        an ask order $O_{ask}$
        a bid order $O_{bid}$
        apiece p
    outputs: a deal order "Odeal: signed by $M_j$ Network Cycle In one embodiment, the network can perform operations including assigning clients' pieces to storage miners and repairing network faults.

1. Assign: The Network assigns clients' pieces to Storage Miners' sectors.

Clients initiate the Put protocol by submitting a bid order in the Storage Market.

When ask and bid orders match, the involved parties jointly commit to the exchange and submit a deal order in the market. At this point, the Network assigns the data to the miner and makes a note of it in the allocation table.

Manage:AssignOrders
  inputs:
    deal orders $O^1$deal ... $O^n$deal
    allocation table allocTable
  outputs: updated allocation table allocTable'

2. Repair: The Network finds faults and attempt to repair them.

All the storage allocations are public to participants in the network. At a block, the Network checks if the required proofs for each assignment are present, checks that they are valid, and acts accordingly:
- if any proof is missing or invalid, the network penalizes the Storage Miners by taking part of their collateral,
- if a large amount of proofs are missing or invalid (defined by a system parameter fault), the network considers the Storage Miner faulty, settles the order as failed and reintroduces a new order for the same piece into the market,
- if every Storage Miner storing this piece is faulty, then the piece is lost and the client gets refunded.

Manage:RepairOrders
  inputs:
    current time t
    current ledger L
    table of storage allocations allocTable
  outputs: orders to repair $O^1$deal ... $O^n$deal, updated allocation table allocTable Beneficial Characteristics of Implementations of the DSN The following are the intuitions on how Filecoin DSNs achieve integrity, retrievability, public verifiability and incentive-compatibility.
- Achieving Integrity: Pieces can be named after their cryptographic hash. After a Put request, clients only need to store this hash to retrieve the data via Get and to verify the integrity of the content received.
- Achieving Retrievability: In a Put request, clients specify the replication factor and the type of erasure coding desired, specifying the storage as (f, m)-tolerant. The assumption is that given m Storage Miners storing the data, a maximum of f faults are tolerated. By storing data in more than one Storage Miner, a client can increase the chances of recovery, in case Storage Miners go offline or disappear.
- Achieving Public Verifiability and Auditability: Storage Miners submit their proofs of storage ($\pi_{SEAL}$, $\pi_{POST}$) to the blockchain. Any user in the network can verify the validity of these proofs, without having access to the outsourced data. Since the proofs are stored on the blockchain, they are a trace of operation that can be audited at any time.
- Achieving Incentive Compatibility: Informally, miners are rewarded for the storage they are providing. When miners commit to store some data, then they can generate proofs. Miners that skip proofs are penalized (by losing part of their collateral) and not rewarded for their storage.
- Achieving Confidentiality: Clients that desire for their data to be stored privately, can encrypt their data before submitting them to the network.

FIG. 7 illustrates examples of the put and get protocols in a Filecoin DSN.

FIG. 8 illustrates example of the manage protocol in a Filecoin DSN.

FIG. 9 illustrates an example generic protocol for a verifiable market/exchange.

Filecoin Storage and Retrieval Markets

Filecoin has two markets: the Storage Market and the Retrieval Market. The two markets have the same structure but different design. The Storage Market allows Clients to reward Storage Miners to store data. The Retrieval Market allows Clients to retrieve data by rewarding Retrieval Miners to deliver the data. In both cases, clients and miners can set their offer and demand prices or accept current offers. The exchanges are run by the Network, the network of full nodes in Filecoin. The network provides for miners to be rewarded by a client when providing a service to the client.

Verifiable Markets

Exchange Markets are protocols that facilitate exchange of a specific good or service. They do this by enabling buyers and sellers to conduct transactions. In the Filecoin DSN, exchanges are verifiable: a decentralized network of participants are able to verify the exchange between buyers and sellers.

In one embodiment, in verifiable markets, where no single entity governs an exchange, transactions are transparent, and anybody can participate, e.g., pseudonymously. Verifiable Market protocols operate the exchange of goods/services in a decentralized fashion: consistency of the orderbooks, orders settlements and correct execution of services are independently verified via the participants, i.e., miners and full nodes in the case of Filecoin. For example, verifiable markets can have the following construction:

A verifiable market can include a protocol with two phases: order matching and settlement. Orders are statements of intent to buy or sell a security, good or service and the orderbook is the list of all the available orders.

Storage Market

The Storage Market is a verifiable market that allows clients (i.e. buyers) to request storage for their data and Storage Miners (i.e. sellers) to offer their storage. In one embodiment, the Storage Market protocol includes the following requirements:
- In-chain orderbook: (1) Storage Miners orders are public, so that the lowest price is known to the network and clients can make informed decision on their orders, (2) client orders are submitted to the orderbook, even when a storage miner accepts the lowest price offered by a client.
- Participants committing their resources: both parties commit to their resources as a way to avoid disservice, to avoid a Storage Miner not providing a service it offers, and to avoid clients not having funds available to award a Storage Miner upon the Storage Miner's completion of the promised service. In order to participate to the Storage Market, a Storage Miner pledges collateral, depositing an amount of collateral proportional to its amount of proposed storage in the DSN. In this way, the Network can incentivize a Storage Miner to provide proofs of storage for the pieces it committed to store. Similarly, clients must deposit the awards specified in the order, ensuring availability of funds during settlement.
- Self-organization to handle faults: In one embodiment, orders are settled if Storage Miners have proved that they have stored the pieces for the duration of the agreed-upon time period. The Network can verify the existence and the correctness of the proof(s). The Network can also act according to the rules outlined in the Repair description provided above.

FIG. 10 illustrates an example of order data structures for retrieval and storage markets/exchanges.

Data Structures

Put Orders. There are three types of orders: bid orders, ask orders and deal orders. Storage Miners create ask orders to add storage, clients create bid orders to request storage, when both parties agree on a price, they jointly create a deal order. The data structures of the orders are shown in detail in FIG. 10, and the parameters of the orders are explicitly defined. Put Orderbook. The Orderbook in the Storage Market is the set of currently valid and open ask, bid and deal orders. Users can interact with the orderbook via the methods defined in the Put protocol: AddOrders, MatchOrders as described in FIG. 7.

The orderbook is public and honest users have the same view of the orderbook. At every epoch, new orders are added to the orderbook if new order transactions (txorder) appear in new blockchain blocks; orders are removed if they are cancelled, expired or settled. Orders are added in blockchain blocks, hence in the orderbook, if they are valid.

One embodiment defines the validity of bid, ask, deal orders as follows: (Valid bid order): A bid order from client $C_i$, $O_{bid}$:=<size, funds[price, time, coll, coding]>$C_i$ is valid if:

$C_i$ has at least the amount of funds available in their account.

time is not set in the past

The order guarantees at least a minimum amount of epochs of storage. (Valid ask order): An ask order from Storage Miner $M_i$, $O_{ask}$:=<space, price>$M_i$ is valid if:

$M_i$ has pledged to be a miner and the pledge will not expire before time epochs.

space must be less than $M_i$'s available storage: $M_i$ pledged storage minus the storage committed in the orderbook (in ask and deal orders).

(Valid deal order): A deal order $O_{deal}$:=<ask, bid, ts>$_{Ci, Mj}$ is valid if ask references an order Oask such that: it is in the Storage Market OrderBook, no other deal orders in the Storage Market OrderBook mention it, it is signed by Ci.

bid references an order Obid such that: it is in the Storage Market OrderBook, no other deal orders in the Storage Market OrderBook mention it, it is signed by Mj.

ts is not set in the future or too far (e.g., more than 30 minutes to an hour) in the past. If a malicious client receives a signed deal from a Storage Miner, but never adds it to the orderbook, then the Storage Miner cannot re-use the storage committed in the deal. The field ts prevents this attack because, after ts, the order becomes invalid and cannot be submitted in the orderbook.

The Storage Market Protocol

With reference to FIG. 11, one embodiment of the Storage Market protocol is divided in two phases: order matching and settlement:

Order Matching: Clients and Storage Miners submit their orders to the orderbook by submitting a transaction to the blockchain (step 1). When orders are matched, the client sends the piece to the Storage Miner and both parties sign a deal order and submit it to the orderbook (step 2).

Settlement: Storage Miners seal their sectors (step 3a), generate proofs of storage for the sector containing the piece and submit them to the blockchain regularly (step 3b); meanwhile, the rest of the network must verify the proofs generated by the miners and repair possible faults (step 3c).

FIG. 12 illustrates an example of a detailed retrieval market/exchange protocol.

With reference to FIG. 12, the illustrated example of the Retrieval Market protocol is divided in two phases: order matching and settlement:

Order Matching: Clients and Retrieval Miners submit their orders to the orderbook by gossiping their orders (step 1). When orders are matched, the client and the Retrieval Miners establish a micropayment channel (step 2).

Settlement: Retrieval Miners send small parts of the piece to the client and for each piece the client sends to the miner a signed receipt (step 3). The Retrieval Miner presents the delivery receipts to the blockchain to get its rewards (step 4).

Useful Work Consensus

Figure 13:
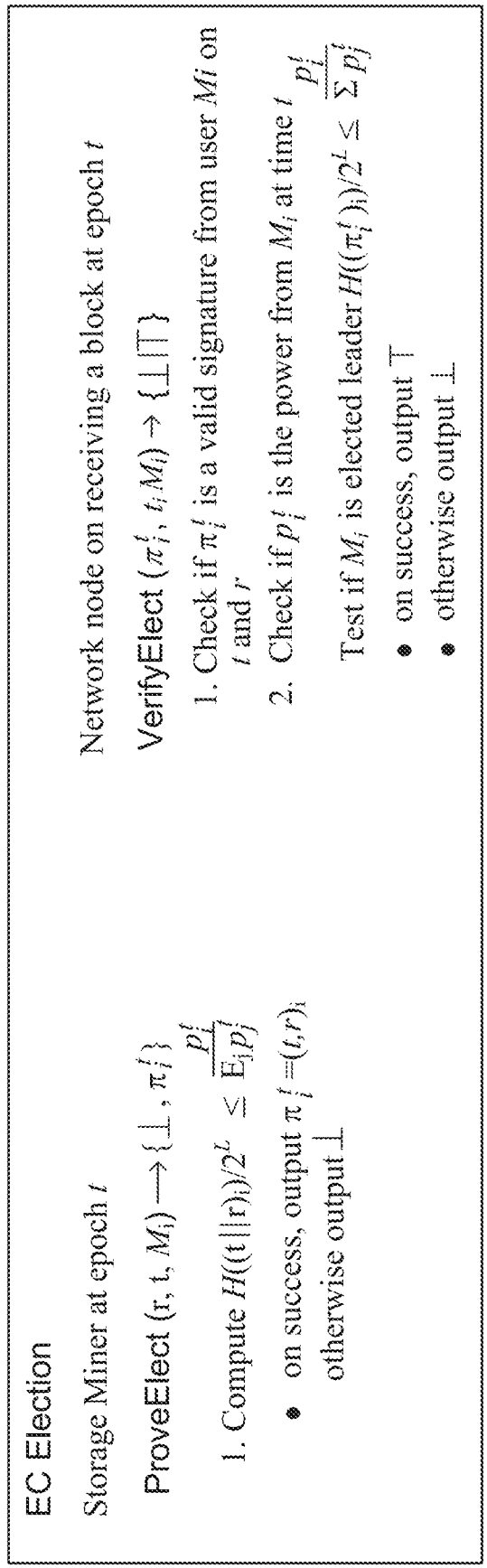
FIG. 13 illustrates an example of a leader election process via an expected consensus protocol.

FIG. 13 illustrates an example of a leader election process via an expected consensus protocol. More generally, the Filecoin DSN protocol can be implemented on top of any consensus protocol that allows for verification of the Filecoin's proofs. In one embodiment, a consensus protocol is implemented based on useful work. Instead of using a wasteful Proof-of-Work computation, miners can utilize useful Proof-of-Spacetime work to participate in a consensus protocol.

Useful Work. For example, work done by the miners in a consensus protocol is useful if the outcome of the computation is valuable to the network, beyond securing the blockchain.

Motivation

While securing the blockchain is a significant consideration, Proof-of-Work schemes often require solving puzzles whose solutions are not reusable or require a substantial amount of wasteful computation to find.

Non-reusable Work: Most permissionless blockchains require miners to solve a hard computational puzzle, such as inverting a hash function. Often the solutions to such a puzzle is useless and does not have any inherent value beyond securing the network.

Wasteful Work: Solving hard puzzles can be really expensive in terms of cost of machinery and energy consumed, especially if the puzzles involved rely heavily on computational power. When the mining algorithm is parallel, then the prevalent factor to solve the puzzle is computational power.

Attempts to reduce waste: Ideally, the majority of a network's resources should be spent on useful work. Some efforts require miners to use more energy-efficient solutions. Some efforts replace hard to solve puzzles with a traditional byzantine agreement based on Proof-of-Stake, where stakeholders vote on the next block proportional to their share of tokens in the system.

One embodiment of a consensus protocol utilizes useful work based on storing client data.

Filecoin Consensus

In one embodiment of a useful work consensus protocol, the probability that the network elects a miner to create a new block (e.g., the voting power of the miner) is proportional to its storage currently in use in relation to the rest of the network. The design of the Filecoin protocol is such that miners would rather invest in storage than in computing power to parallelize the mining computation. Miners offer storage and re-use the proof that data is being stored to participate in the consensus.

Modeling Mining Power

Power Fault Tolerance. Power Fault Tolerance is an abstraction that re-frames byzantine faults in terms of participants' influence over the outcome of the protocol. Every participant controls some power of which n is the total power in the network, and f is the fraction of power controlled by faulty or adversarial participants.

Power in Filecoin. In one embodiment of Filecoin, the power $p^t_i$ of miner $M_i$ at time t is the sum of the $M_i$'s storage assignments. The influence $I^t_i$ of $M_i$ is the fraction of $M_i$'s power over the total power in the network.

In one embodiment of Filecoin, power has the following properties:

Public: The total amount of storage currently in use in the network is public. By reading the blockchain, anyone can calculate the storage assignments of each miner—hence anyone can calculate the power of each miner and the total amount of power at any point in time.

Publicly verifiable: For each storage assignment, miners generate Proofs-of-Spacetime, proving that the service is being provided. By reading the blockchain, anyone can verify if the power claimed by a miner is correct.

Variable: At any point in time, miners can add new storage in the network by pledging with a new sector and filling the sector. In this way, a miner can change the amount of power it has through time.

Accounting for Power with Proof-of-Spacetime

In one embodiment, every $\Delta_{proof}$ blocks, the protocol asks miners to submit Proofs-of-Spacetime to the network, which are only successfully added to the blockchain if the majority of power in the network considers them valid. At every block, every full node updates the AllocTable, adding new storage assignments, removing expiring ones and marking missing proofs.

In one embodiment, the power of a miner Mi can be calculated and verified by summing the entries in the AllocTable, which can be done in at least two ways:

Full Node Verification: If a node has the full blockchain log, run the NetworkProtocol from the genesis block to the current block and read the AllocTable for miner Mi. This process verifies every Proof-of-Spacetime for the storage currently assigned to Mi.

Simple Storage Verification: Assume a light client has access to a trusted source that broadcasts the latest block. A light client is a client that doesn't have access to the entire blockchain, instead it only has access to the hash of the latest block from a trusted source and a way to request block headers from the network. A light client can request from nodes in the network: (1) the current AllocTable entry for miner Mi, (2) a Merkle path that proves that the entry was included in the state tree of the last block, (3) the headers from the genesis block until the current block. In this way, the light client can delegate the verification of the Proof-of-Spacetime to the network.

The security of the power calculation comes from the security of Proof-of-Spacetime. In this setting, PoSt ensures that the miner cannot lie about the amount of assigned storage they have. Indeed, a miner cannot claim to store more than the data it is storing, since this would require spending time fetching and running the slow PoSt:Setup, and such a miner cannot generate proofs faster by parallelizing the computation, since PoSt:Prove is a sequential computation.

Using Power to Achieve Consensus

In one embodiment, the Filecoin consensus extends Proof-of-Stake consensus protocols, where stake is replaced with assigned storage. For example, the Filecoin consensus can be implemented using Expected Consensus. In one embodiment, Expected Consensus elects, at every round, one (or more) miners where the probability of a miner winning an election is proportional to that miner's assigned storage.

Expected Consensus. The basic intuition of Expected Consensus (EC) is to deterministically, unpredictably, and secretly elect a small set of leaders (e.g., 1-4) at each epoch. On expectation, the number of elected leaders per epoch is 1, but some epochs may have zero or many leaders. Leaders extend the chain by creating a block and propagating it to the network. At each epoch, the chain is extended with one or multiple blocks. In one embodiment, each leader can add one block. In case of a leaderless epoch, an empty block is added to the chain. Although the blocks in chain can be linearly ordered, the block chain's data structure can be a direct acyclic graph. EC is a probabilistic consensus, where each epoch introduces more certainty over previous blocks, eventually reaching enough certainty that the likelihood of a different history is sufficiently small. A block is committed if the majority of the participants add their weight on the chain where the block belongs to, by extending the chain or by signing blocks.

Electing Miners. At every epoch, each miner checks if they are elected leader, this is done similarly to existing consensus protocols:

(EC Election in Filecoin) A miner Mi is a leader at time t if the following condition is met:

$$\mathcal{H}(\langle t \| rand(t) \rangle_{Mi})/2^L \leq \frac{p^t_i}{\sum_j p^t_j}$$

Where rand(t) is a function that extracts randomness from the blockchain at epoch t, $p^t_i$ is the power of $M_i$. Consider the size of H(m) to be L for any m, H to be a secure cryptographic hash function and $\langle m \rangle_{Mi}$ to be a message m signed by $M_i$, such that:

$$(m)_{Mi} = ((m), SIG_{Mi}(\mathcal{H}(m)))$$

FIG. 13 further shows the protocol between a miner (ProveElect) and a network node (VerifyElect).

This election scheme provides three properties: fairness, secrecy and public verifiability.

Fairness: each participant has only one trial for each election, since signatures are deterministic and t and rand(t) are fixed. Assuming H is a secure cryptographic hash function, then $\mathcal{H}((t\|rand(t))_{Mi}/2^L$ must be a real number uniformly chosen from (0, 1). Hence, the probability for the equation to be true must be $$p^t_i / \sum_j p^t_j,$$

which is equal to the miner's portion of power within the network. Because this probability is linear in power, this likelihood is preserved under splitting or pooling power. Note that the random value rand(t) is not known before time t.

Secret: an efficient adversary that does not own the secret key Mi can compute the signature with negligible probability, given the assumptions of digital signatures.

Public Verifiability: an elected leader $i \in L^t$ can convince an efficient verifier by showing t, rand(t), $\mathcal{H}((t\|rand$ $(t))_i)/2^L$; given the previous point, no efficient adversary can generate a proof without having a winning secret key.

Figure 14:
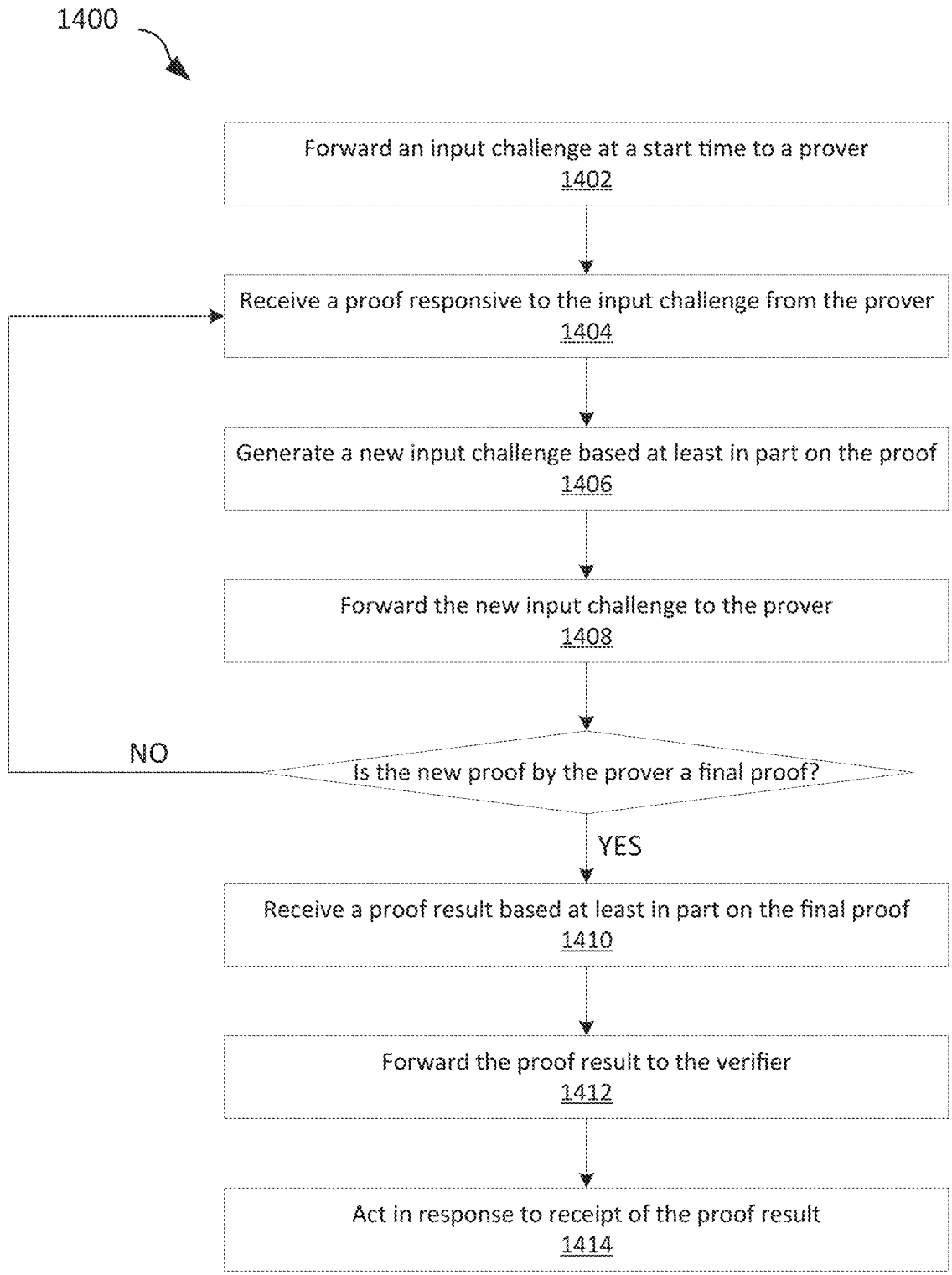
FIG. 14 is a flowchart of an example process for a space-time proof.

FIG. 14 is a flowchart of an example process 1400 for a space-time proof. The process 1400 includes: receiving 1402 at a prover, an initial input challenge; producing 1403, e.g., at the prover, an output proof proving that the prover has access to specified data for a specified time, e.g., for at least a minimum period of time (the producing step 1403 includes: producing 1404, e.g., at a prover, an initial proof responsive to the initial input challenge, the initial proof proving that the prover is storing specified data; generating 1406, e.g., at the prover, a new input challenge based at least in part on the initial proof; producing 1408, e.g., at the prover, a new proof responsive to the new input challenge, the new proof proving that the prover is storing the specified data; and Repeating 1409, e.g., at the prover, the generating step and the producing a new proof responsive to the new input challenge step a number of times, the repeating step generating sequential proofs of storage to determine time of storage, wherein each generating step is based at least in part on a most recent new proof, the repeating step 1409 producing 1410 an output proof, forwarding 1412 the output proof to a blockchain; and receiving 1414 tokens at least in part in response to forwarding the output proof to the blockchain. The output proof can be labeled with a loop counter index. The method can further include checking, at a verifier, if the prover is storing the specified data for at least a minimum period of time.

Figure 15:
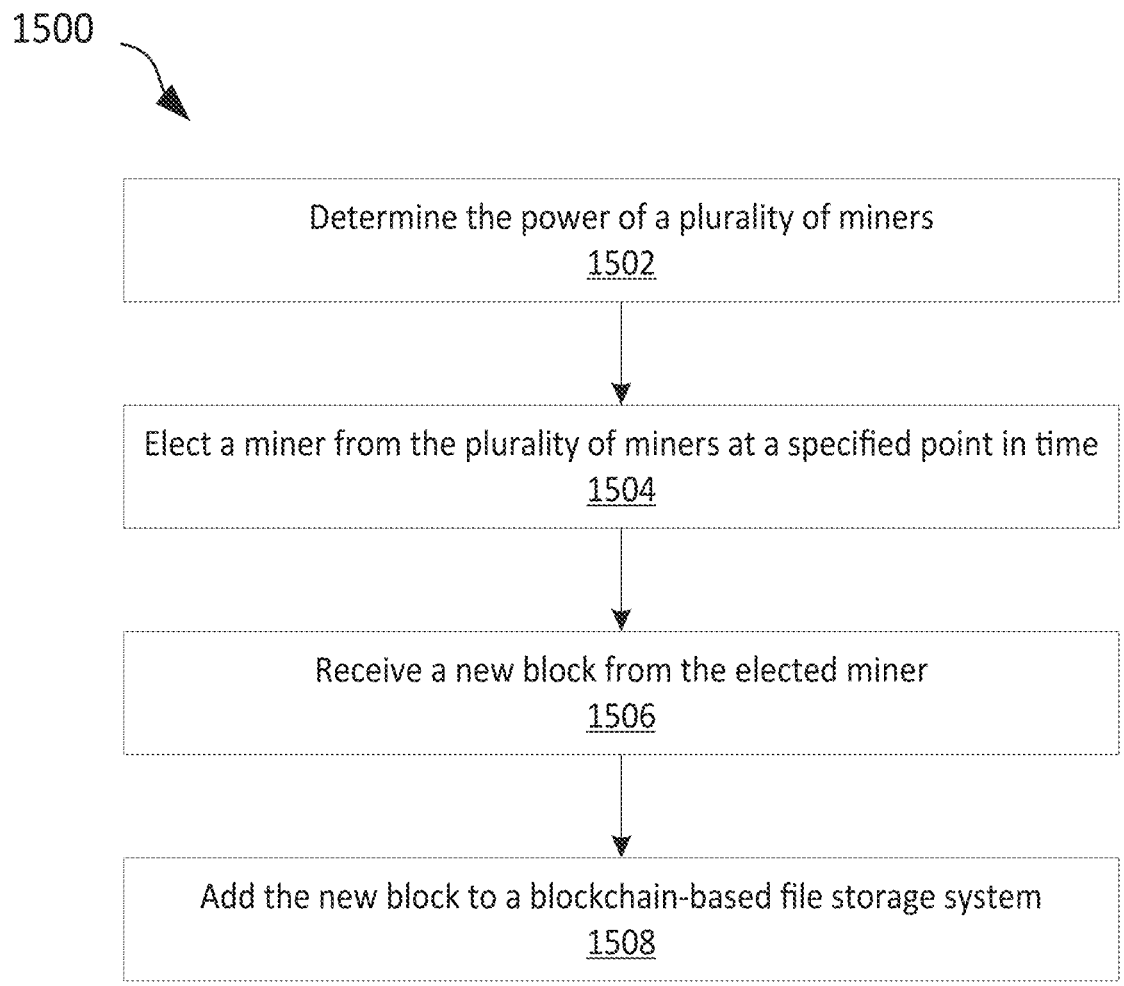
FIG. 15 is a flowchart of an example process for determining a winning prover from a plurality of candidate provers.

FIG. 15 is a flowchart of an example process 1500 for determining a winning prover from a plurality of candidate provers. The process 1500 includes: determining 1502 the power of a plurality of miners; electing 1504 a miner from the plurality of miners; receiving 1506 a new block from the elected miner; and adding 1508 the new block to a blockchain-based file storage system.

Figure 16:
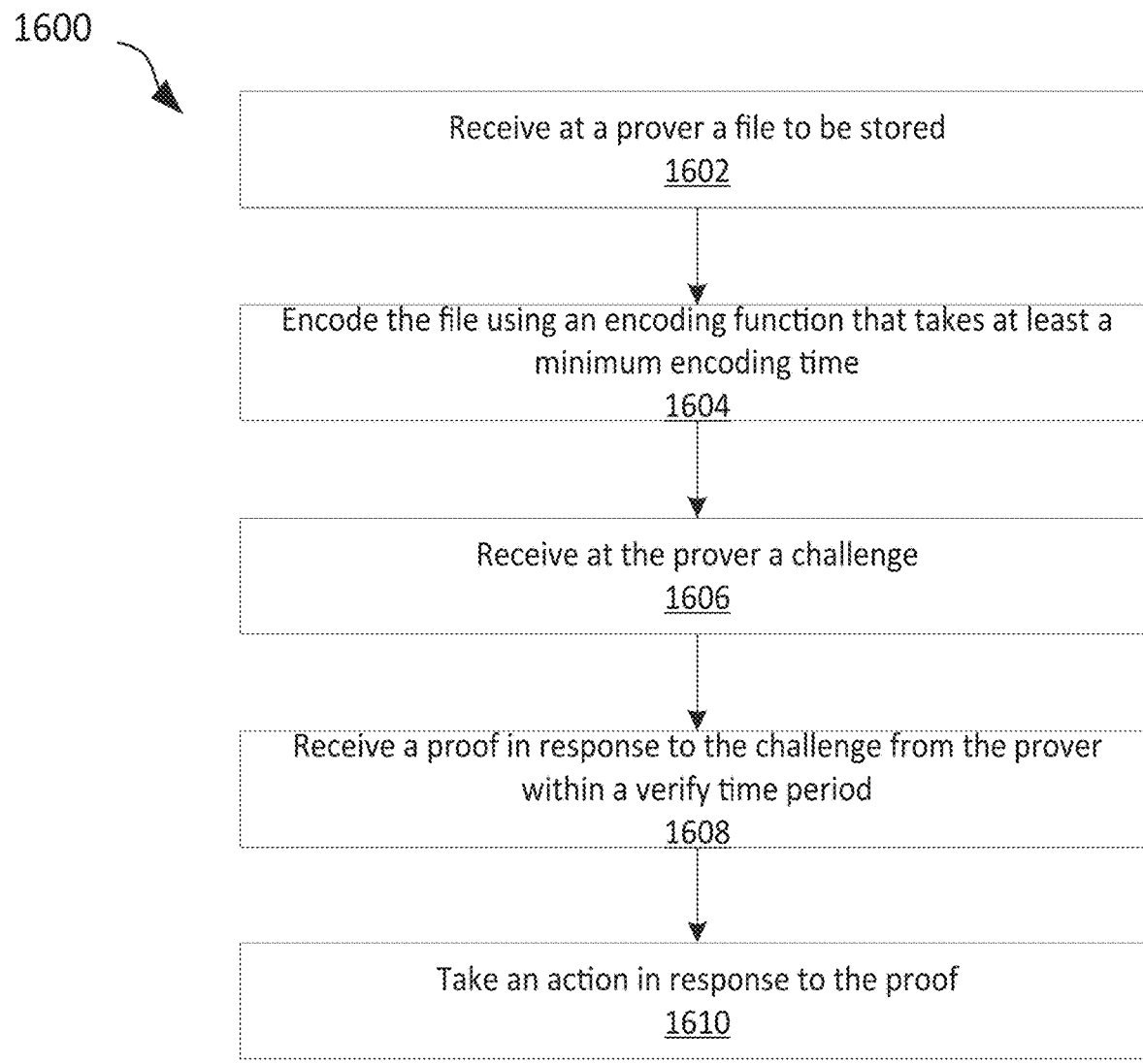
FIG. 16 is a flowchart of an example process for proof of replication.

FIG. 16 is a flowchart of an example process 1600 for proof of replication. The process 1600 includes: receiving 1602 at a prover a file to be stored and storing the file; encoding 1604 the stored file using an encoding function that takes at least a minimum encoding time; receiving 1606 at the prover a challenge; producing 1608 a proof at the prover in response to the challenge from the prover within a verify time period; and taking an action 1610 in response to the proof.

Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, at a verifier, the frequency of input challenges that a prover will receive;
receiving at a verifier, an output proof, the output proof having been generated by steps comprising:
receiving, at a prover, an initial input challenge;
producing, at the prover, an output proof proving that the prover has access to specified data for a specified time, wherein producing the output proof comprises:
producing, at the prover, an initial proof responsive to the initial input challenge, the initial proof proving that the prover is storing specified data;
generating, at the prover, a new input challenge based at least in part on the initial proof;
producing, at the prover, a new proof responsive to the new input challenge, the new proof proving that the prover is storing the specified data; and
repeating, at the prover, the generating step and the producing a new proof responsive to the new input challenge step a number of times, the repeating step generating sequential proofs of storage to determine time of storage, wherein each generating step is based at least in part on a most recent new proof,
receiving the output proof at the verifier; and
verifying, at the verifier, the output proof.

2. The method of claim 1 wherein the method further comprises sending tokens at least in part in response to forwarding the output proof to a blockchain.

3. The method of claim 1 wherein the output proof is labeled with a loop counter index.

4. The method of claim 1 wherein the verifying, at the verifier, the output proof further comprises checking, at the verifier, if the prover is storing the specified data for at least a minimum period of time.

5. The method of claim 1 wherein the method further comprises providing a stake in management of a file storage system in response to the output proof being forwarded to a blockchain.

6. The method of claim 1 wherein receiving an initial input challenge comprises receiving a plurality of initial input challenges and where a type and a frequency of the input challenges are specified during a setup process between the prover and the verifier.

7. The method of claim 1 wherein the method further comprises allocating specified benefits to the prover in response to forwarding the output proof to a blockchain.

8. The method of claim 7 wherein the specified benefits comprise deferrable access to data storage services.

9. A method comprising:
receiving, at a verifier, the frequency of input challenges that a prover will receive;
receiving at a verifier, an output proof, the output proof having been generated by steps comprising:
  receiving data at a prover;
  performing a seal operation on the data;
  receiving, at the prover, an initial input challenge;
  producing an output proof, wherein producing the output proof comprises:
    producing an initial proof responsive to the initial input challenge, the initial proof proving that the prover is storing specified data;
    generating a new input challenge based at least in part on the initial proof,
    producing a new proof responsive to the new input challenge, the new proof proving that the prover is storing the specified data; and
    repeating the generating step and the producing a new proof responsive to the new input challenge step a specified number of times resulting in an output proof, wherein the generating a new input challenge is based at least in part on a most recent new proof, and wherein performing the seal operation is several orders of magnitude slower than producing an output proof,
  receiving the output proof at the verifier; and
  verifying, at the verifier, the output proof.

10. The method of claim 9 wherein the method further comprises sending tokens at least in part in response to forwarding the output proof to a blockchain.

11. The method of claim 9 wherein the output proof is labeled with a loop counter index.

12. The method of claim 9 wherein the verifying, at the verifier, the output proof further comprises checking, at the verifier, if the prover is storing the specified data for at least a minimum period of time.

13. The method of claim 9 wherein the method further comprises providing a stake in management of a file storage system in response to the output proof being forwarded to a blockchain.

14. The method of claim 9 wherein receiving an initial input challenge comprises receiving a plurality of initial input challenges and where a type and a frequency of the input challenges are specified during a setup process between the prover and the verifier.

15. The method of claim 9 wherein the method further comprises allocating specified benefits to the prover in response to forwarding the output proof to a blockchain.

16. The method of claim 15 wherein the specified benefits comprise deferrable access to data storage services.

17. A system comprising:
one or more computers and one or more storage devices on which are stored instructions that are operable, when executed by the one or more computers, to cause the one or more computers to perform operations comprising:
  receiving, at a verifier, the frequency of input challenges that a prover will receive;
  receiving at a verifier, an output proof, the output proof having been generated by steps comprising:
    receiving, at a prover, an initial input challenge;
    producing, at the prover, an output proof proving that the prover has access to specified data for a specified time, wherein producing the output proof comprises:
      producing, at the prover, an initial proof responsive to the initial input challenge, the initial proof proving that the prover is storing specified data;
      generating, at the prover, a new input challenge based at least in part on the initial proof;
      producing, at the prover, a new proof responsive to the new input challenge, the new proof proving that the prover is storing the specified data; and
      repeating, at the prover, the generating step and the producing a new proof responsive to the new input challenge step a number of times, the repeating step generating sequential proofs of storage to determine time of storage, wherein each generating step is based at least in part on a most recent new proof, and
  receiving the output proof at the verifier; and
  verifying, at the verifier, the output proof.

18. The system of claim 17 wherein the operations further comprise sending tokens at least in part in response to forwarding the output proof to a blockchain.

19. The system of claim 17 wherein the output proof is labeled with a loop counter index.

20. The system of claim 17 wherein verifying, at the verifier, the output proof further comprises checking, at the verifier, if the prover is storing the specified data for at least a minimum period of time.

* * * * *

UNITED STATES PATENT AND TRADEMARK OFFICE
CERTIFICATE OF CORRECTION

| | | |
|---|---|---|
| PATENT NO. | : 12,294,654 B1 | Page 1 of 1 |
| APPLICATION NO. | : 18/075794 | |
| DATED | : May 6, 2025 | |
| INVENTOR(S) | : Nicola Greco and Juan Batiz-Benet | |

It is certified that error appears in the above-identified patent and that said Letters Patent is hereby corrected as shown below:

On the Title Page

Column 2 item (57), (Abstract), Line 19, delete "proof," and insert -- proof; --

In the Specification

Column 1, Line 31, delete "of the all" and insert -- of all --

In the Claims

Column 32, Line 42, Claim 1, delete "proof," and insert -- proof; --

Column 33, Line 15, Claim 9, delete "proof," and insert -- proof; --

Column 33, Line 27, Claim 9, delete "proof," and insert -- proof; --

Column 34, Line 34, Claim 17, delete "proof," and insert -- proof; --

Signed and Sealed this
First Day of July, 2025

Coke Morgan Stewart
*Acting Director of the United States Patent and Trademark Office*